(12) United States Patent
Seamans

(10) Patent No.: US 11,865,399 B2
(45) Date of Patent: Jan. 9, 2024

(54) MOBILE OUTDOOR GYM AND RESISTANCE WEIGHT TRAINING EQUIPMENT

(71) Applicant: Mount Out Gear, LLC, Oneida, NY (US)

(72) Inventor: James Seamans, Oneida, NY (US)

(73) Assignee: Mount Out Gear, Oneida, NY (US)

(*) Notice: Subject to any disclaimer, the term of this patent is extended or adjusted under 35 U.S.C. 154(b) by 263 days.

(21) Appl. No.: 16/930,268

(22) Filed: Jul. 15, 2020

(65) Prior Publication Data
US 2022/0016470 A1 Jan. 20, 2022

(51) Int. Cl.
| A63B 21/16 | (2006.01) |
| A63B 21/04 | (2006.01) |
| B60R 9/06 | (2006.01) |
| F16M 13/02 | (2006.01) |
| A63B 71/00 | (2006.01) |

(52) U.S. Cl.
CPC .......... *A63B 21/16* (2013.01); *A63B 21/0442* (2013.01); *A63B 71/0036* (2013.01); *B60R 9/06* (2013.01); *F16M 13/02* (2013.01); *A63B 2225/093* (2013.01)

(58) Field of Classification Search
CPC .................... A63B 21/169; A63B 21/02–0557
See application file for complete search history.

(56) References Cited

U.S. PATENT DOCUMENTS

| 4,403,716 A * | 9/1983 | Carlson ..................... B60R 9/06 224/508 |
| 4,789,156 A * | 12/1988 | D'Annunzio ........ A63B 63/083 280/727 |
| 5,573,238 A * | 11/1996 | Aaron .................. A63B 71/023 473/483 |
| 6,267,711 B1 * | 7/2001 | Hinds ................ A63B 21/1663 482/904 |
| 6,328,679 B1 * | 12/2001 | Croft .................... A63B 21/169 482/904 |
| 7,229,392 B2 * | 6/2007 | Turnbull ............ A63B 21/4013 482/904 |
| 8,485,951 B1 * | 7/2013 | Adams ............ A63B 21/00072 482/904 |
| 9,320,934 B1 * | 4/2016 | Pringle ................ A63B 21/068 |

(Continued)

OTHER PUBLICATIONS

Portable Power Rack_HitchFit "https://www.mobilefitnessequipment.com/products/hitchfit" May 29, 2020 (Year: 2020).*

*Primary Examiner* — Nyca T Nguyen
(74) *Attorney, Agent, or Firm* — Steven A. Wood, Esq.

(57) ABSTRACT

The present invention provides a sports equipment training device, comprising a mounting member, configured to mount the device to a vehicle hitch or to a wall mount, wherein the mounting member has a horizontal hitch or mount receiver portion and a vertical main connector portion configured to receive and connect to a base upright support post; one or more upright support posts, starting with a first upright support post comprising a base upright support post, with each additional upright support post fitting into or over the immediate lower upright support post; one or more anchor loops, wherein the one or more anchor loops may be affixed to one or more of the one or more upright support posts.

21 Claims, 40 Drawing Sheets

(56) References Cited

U.S. PATENT DOCUMENTS

| | | | |
|---|---|---|---|
| 9,862,299 B2* | 1/2018 | Johnson | B60R 99/00 |
| 10,058,756 B1* | 8/2018 | Basilone | A63B 69/0002 |
| 10,150,024 B1* | 12/2018 | Esparza | A63B 71/0036 |
| 10,159,866 B2* | 12/2018 | Carter | A63B 23/03541 |
| 10,307,634 B2* | 6/2019 | Young | A63B 71/023 |
| 10,493,312 B2* | 12/2019 | Breland | A63B 21/169 |
| 10,625,111 B2* | 4/2020 | Beaver | A63B 17/00 |
| 10,843,636 B1* | 11/2020 | Derose | B60R 9/06 |
| 2005/0143231 A1* | 6/2005 | Turnbull | A63B 21/04 482/904 |
| 2006/0186638 A1* | 8/2006 | Varner | A63B 71/023 280/506 |
| 2007/0259764 A1* | 11/2007 | Kelly | A63B 69/34 482/904 |
| 2007/0270292 A1* | 11/2007 | Laney | A63B 22/0605 482/121 |
| 2008/0128463 A1* | 6/2008 | Bryan | A63B 21/00047 224/486 |
| 2009/0215594 A1* | 8/2009 | Panaiotov | A63B 21/16 482/130 |
| 2009/0247376 A1* | 10/2009 | Merrithew | A63B 23/0355 482/121 |
| 2011/0195822 A1* | 8/2011 | Donofrio | A63B 1/00 482/129 |
| 2011/0237410 A1* | 9/2011 | Perez | A63B 21/16 482/129 |
| 2013/0053220 A1* | 2/2013 | Monaco | A63B 1/00 482/39 |
| 2013/0225372 A1* | 8/2013 | Rochford | A63B 21/0442 482/129 |
| 2014/0018215 A1* | 1/2014 | Donofrio | A63B 21/169 482/129 |
| 2014/0296037 A1* | 10/2014 | Razzaq | A63B 21/4029 482/99 |
| 2015/0202483 A1* | 7/2015 | Ho | A63B 21/00069 482/142 |
| 2015/0251039 A1* | 9/2015 | Mikulski | A63B 21/0442 482/126 |
| 2015/0290488 A1* | 10/2015 | Hopperstad | A63B 17/04 482/38 |
| 2016/0144258 A1* | 5/2016 | Stephens | A63B 69/36212 473/409 |
| 2017/0100624 A1* | 4/2017 | Young | A63B 71/023 |
| 2018/0333632 A1* | 11/2018 | Mitsis-Koutoukis | A63B 21/068 |
| 2019/0175976 A1* | 6/2019 | Breland | A63B 21/169 |
| 2020/0114195 A1* | 4/2020 | Henniger | A63B 21/154 |
| 2021/0220691 A1* | 7/2021 | Ivanov | A63B 21/0414 |

* cited by examiner

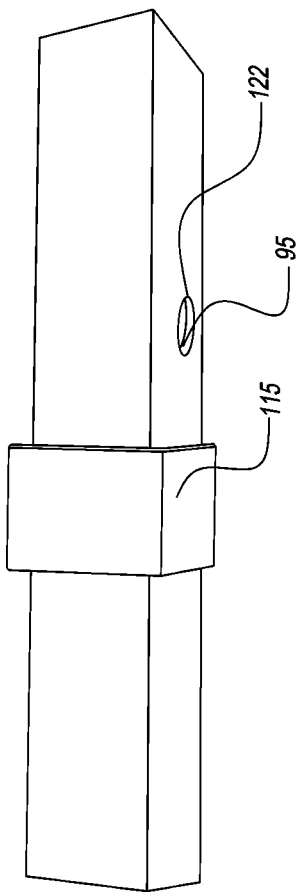
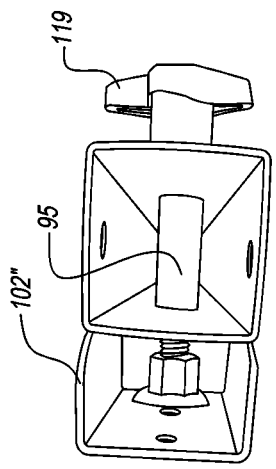
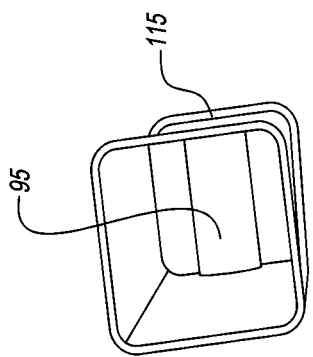
FIG. 5A
FIG. 5C
FIG. 5B

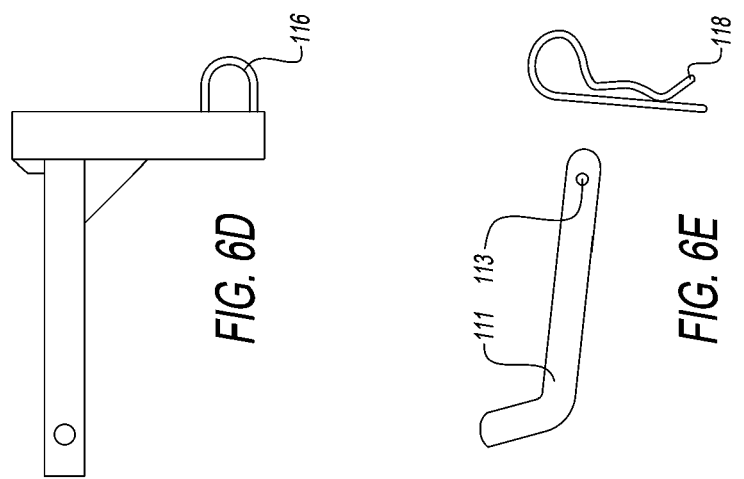
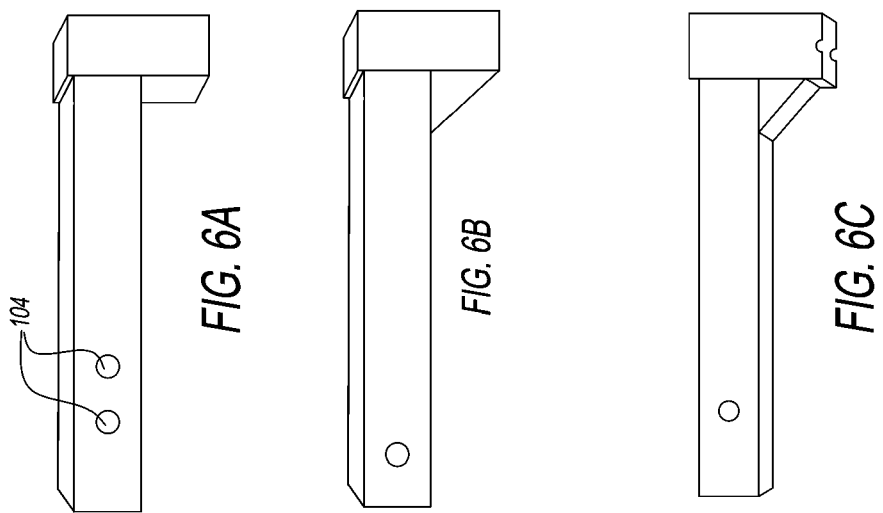

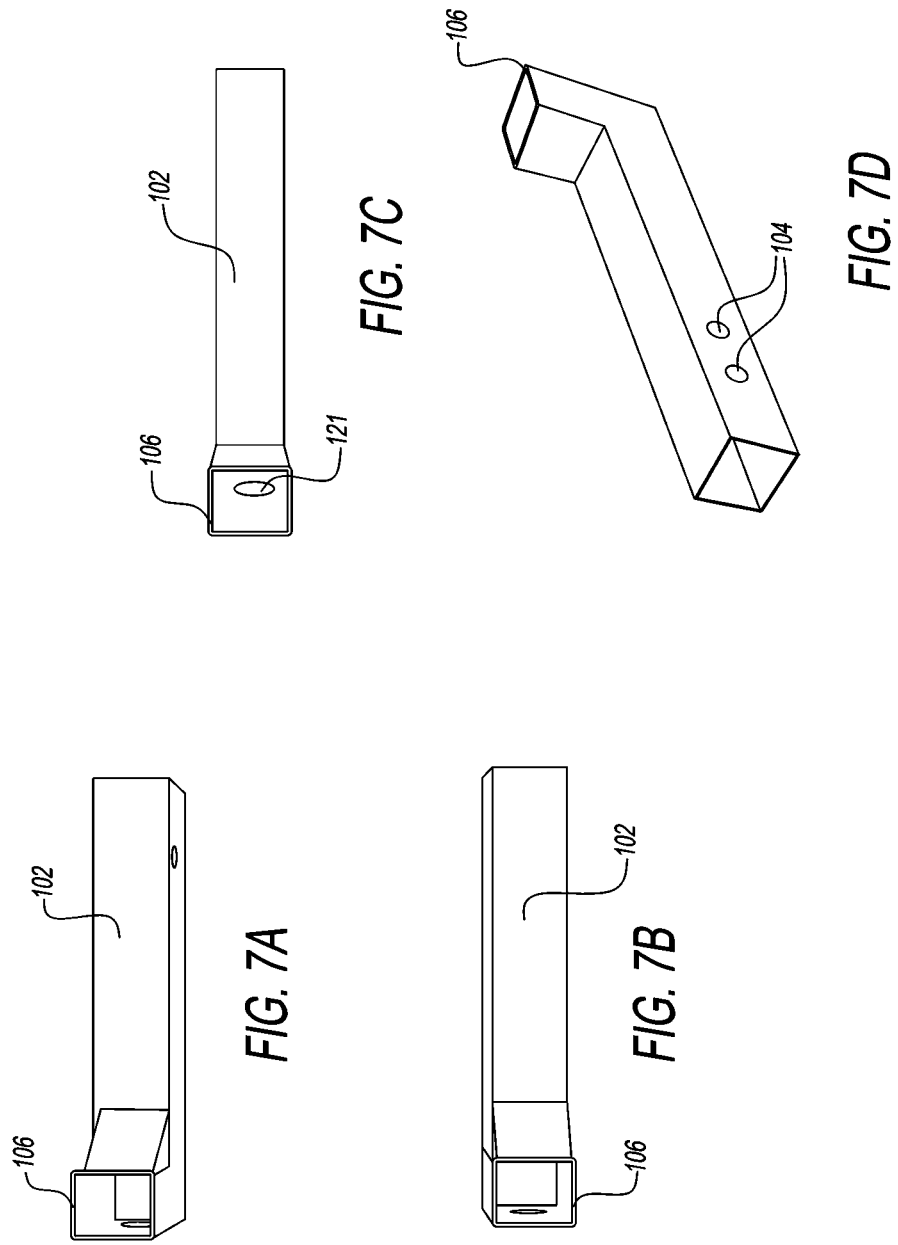

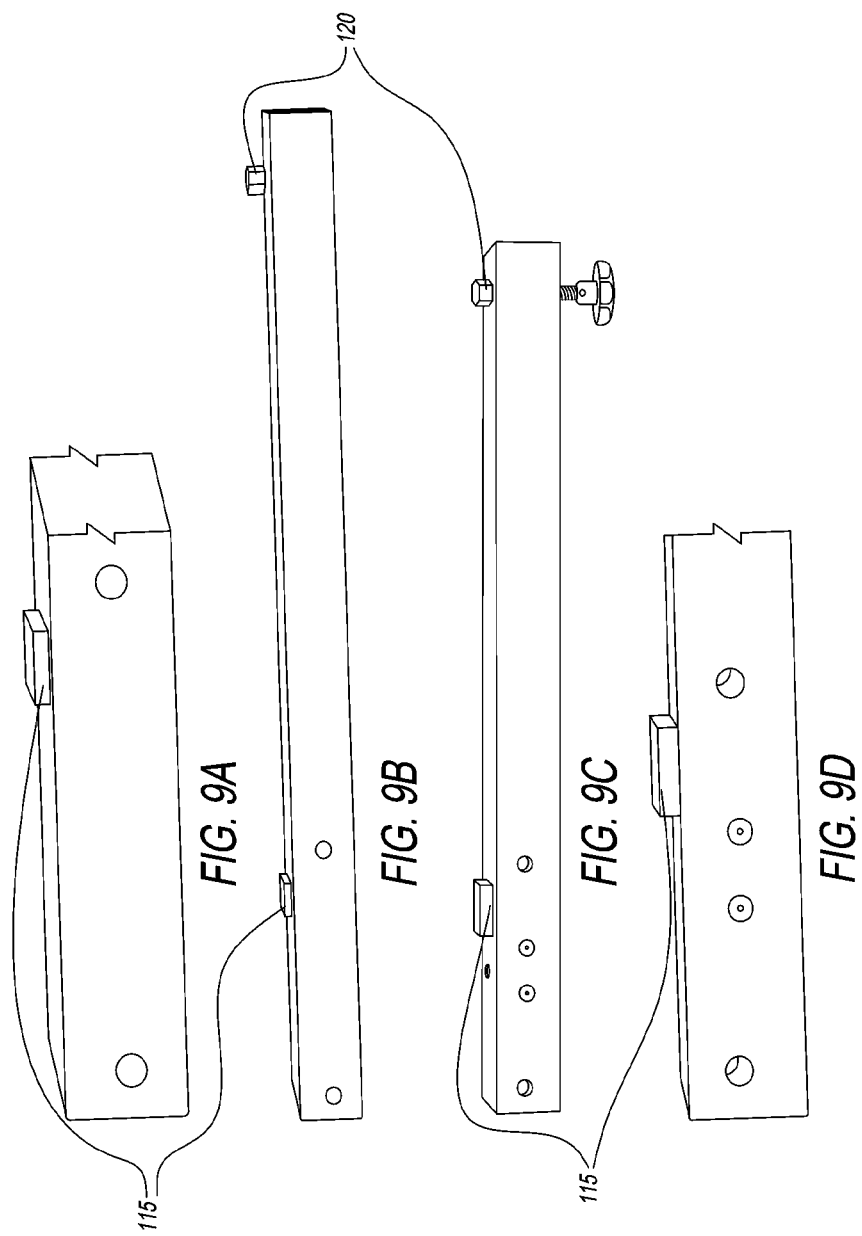

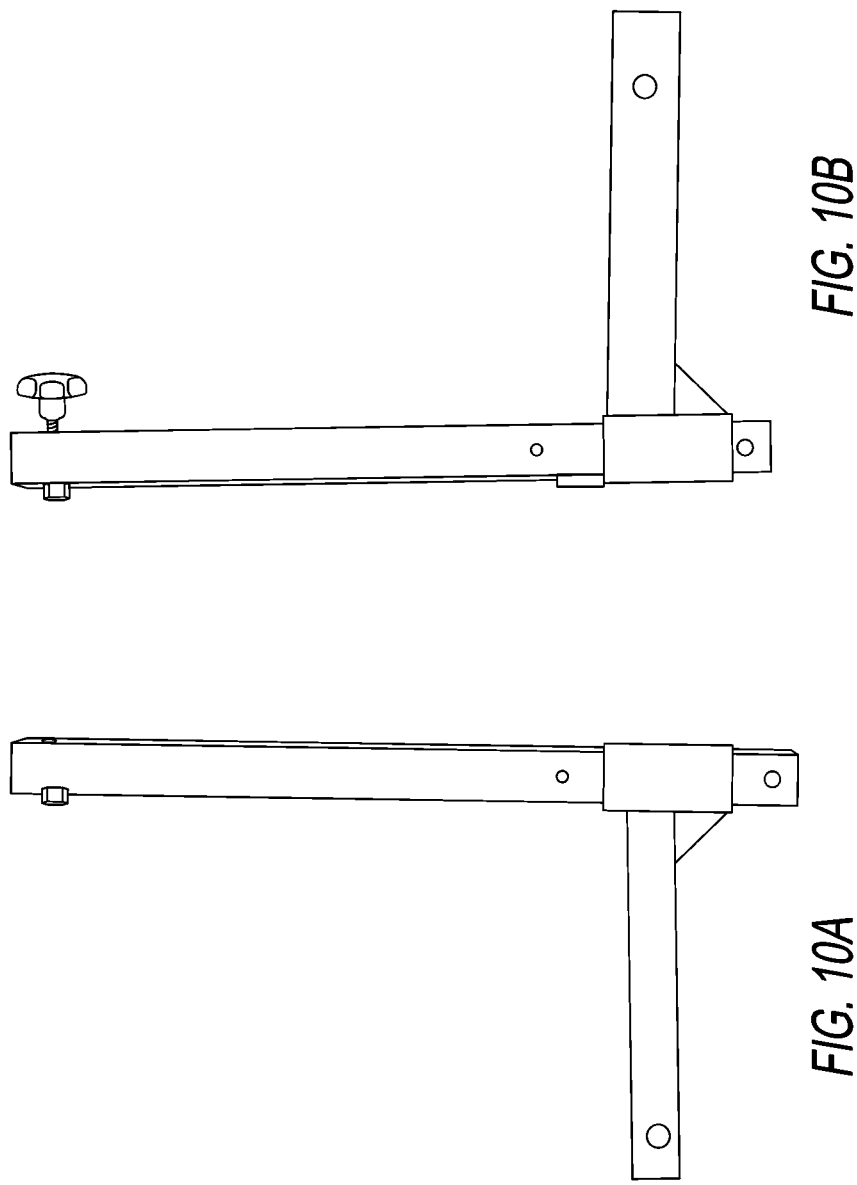

MOBILE OUTDOOR GYM AND RESISTANCE WEIGHT TRAINING EQUIPMENT

CROSS REFERENCE TO RELATED U.S. PATENT APPLICATIONS

This application is a non-provisional of and claims the benefit under 35 U.S.C. § 119(e) of the earlier filing date of U.S. Provisional Application Ser. No. 62/874,956, filed on Jul. 16, 2019, which is hereby incorporated in entirety by reference.

BACKGROUND

1. Field of the Invention

The present invention relates to equipment designed for mobility and configured to enable outdoor weight training at the time and location of the user's choosing. In particular, the present invention relates to resistance tube and resistance band weight training, and equipment configured to enable the same.

2. Description of Related Art

Since the first patent grant (U.S. Pat. No. 562,389) to Gustav Gossweiler on Jun. 23, 1896 for a resistance-based training device, resistance-based training equipment has continued to evolve. The Dec. 3, 1940 patent grant (U.S. Pat. No. 2,224,103) to Raymond Nilson represents one of, if not the, first elastic resistance band inventions to be patented. Then in the 1980's, football coach Dick Hartzell, from Youngstown, PA, patented and helped popularize light- and heavy-duty training bands for powerlifting.

In parallel with the increased interest and participation in weight training and sports activities throughout the $20^{th}$ century, appreciation for and enjoyment of the outdoors likewise increased dramatically, with millions of annual visitors to the many state and national parks across the nation.

Outdoor workouts are extremely popular, with many cities and communities providing outdoor exercise equipment and fitness parks to make it convenient for the citizenry to workout. The equipment in these outdoor parks must be bolted down and fixed in place in order to prevent more cynical citizens from absconding with it, limiting the use of the exercise equipment to specific locations.

Contemporary portable exercise equipment capable of enabling the user to exercise in any location of their choosing include the Gorilla Bow® resistance band trainer and the HitchFit, and other free-weight mobile gym equipment by Mobile Fitness Equipment, of Brockton, MA.

However, no outdoor gym currently exists that enables weight-free training in any location of the user's choosing.

SUMMARY OF THE INVENTION

The following summary of the present invention is presented to provide a basic understanding of some aspects of the invention and to facilitate an understanding of some of the innovative features unique to the disclosed embodiment, and it is not intended to be a full description. This summary is not intended to identify all key or critical elements of the invention or to delineate the entire scope of the invention. The sole purpose of this summary is to present some concepts of the invention in a simplified form as a prelude to the more detailed description presented below. A full appreciation of the various aspects of the embodiments disclosed herein can be gained by taking the entire specification, claims, drawings, and abstract as a whole.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

It is, therefore, one aspect of the disclosed embodiments to provide a sports equipment training device, comprising a mounting member, configured to mount the device to a vehicle hitch or to a wall mount, wherein the mounting member has a horizontal hitch or mount receiver portion and a vertical main connector portion configured to receive and connect to a base upright support post; one or more upright support posts, starting with a first upright support post comprising a base upright support post, with each additional upright support post fitting into or over the immediate lower upright support post; one or more anchor loops, wherein the one or more anchor loops may be affixed to one or more of the one or more upright support posts.

These and other aspects of the present invention are realized in a system and method as shown and described in the following FIGs and related description. Additional features and advantages of the invention will be set forth in the detailed description which follows, taken in conjunction with the accompanying drawings, which together illustrate by way of example, the features of the invention.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention. The figures are provided for purposes of illustration only and merely depict typical or example embodiments. These drawings are provided to facilitate the reader's understanding and shall not be considered limiting of the breadth, scope, or applicability various embodiments.

Non-limiting and non-exhaustive features will be described with reference to the following figures, wherein like reference numerals within the detailed description refer to like parts throughout the various figures. The figures described below were not intended to be drawn to any precise scale with respect to size, angular relationship, or relative position. Various embodiments of the present invention are shown and described in reference to the numbered drawings wherein:

FIGS. 2A and 2C depict embodiments configured to attach to a vehicle hitch. FIGS. 2B and 2C depict embodiments configured to attach to a wall mount (e.g., to function as a home wall mounted unit).

FIGS. 5A-5C depict an exemplary portion of an upper support post that is inserted into and locked into place within a lower support post. In particular, FIGS. 5B and 5C depict an inner reinforcement of the support posts, through which the star knob bolts pass to lock the support post in place.

FIGS. 6A-6E depict side views of various embodiments of the vehicle hitch adapter. FIG. 6E depicts an exemplary hitch pin.

FIGS. 7A-7D depict top-down views of various embodiments of the vehicle hitch adapter.

FIGS. 9A-9D depict close up, side views of exemplary MOG base support posts.

FIGS. 10A-10B depict close up, side views of the exemplary MOG base support posts, inserted into and connected with the exemplary vehicle hitch mount adapters.

FIG. 16B) top-down views of the fabric backstop, with the backstop rods and the backstop rod holder of the middle upright support post aligned to show where the backstop cutout (FIG. 16A) allows the middle backstop rod to engage the MOG spire.

Figure 1:
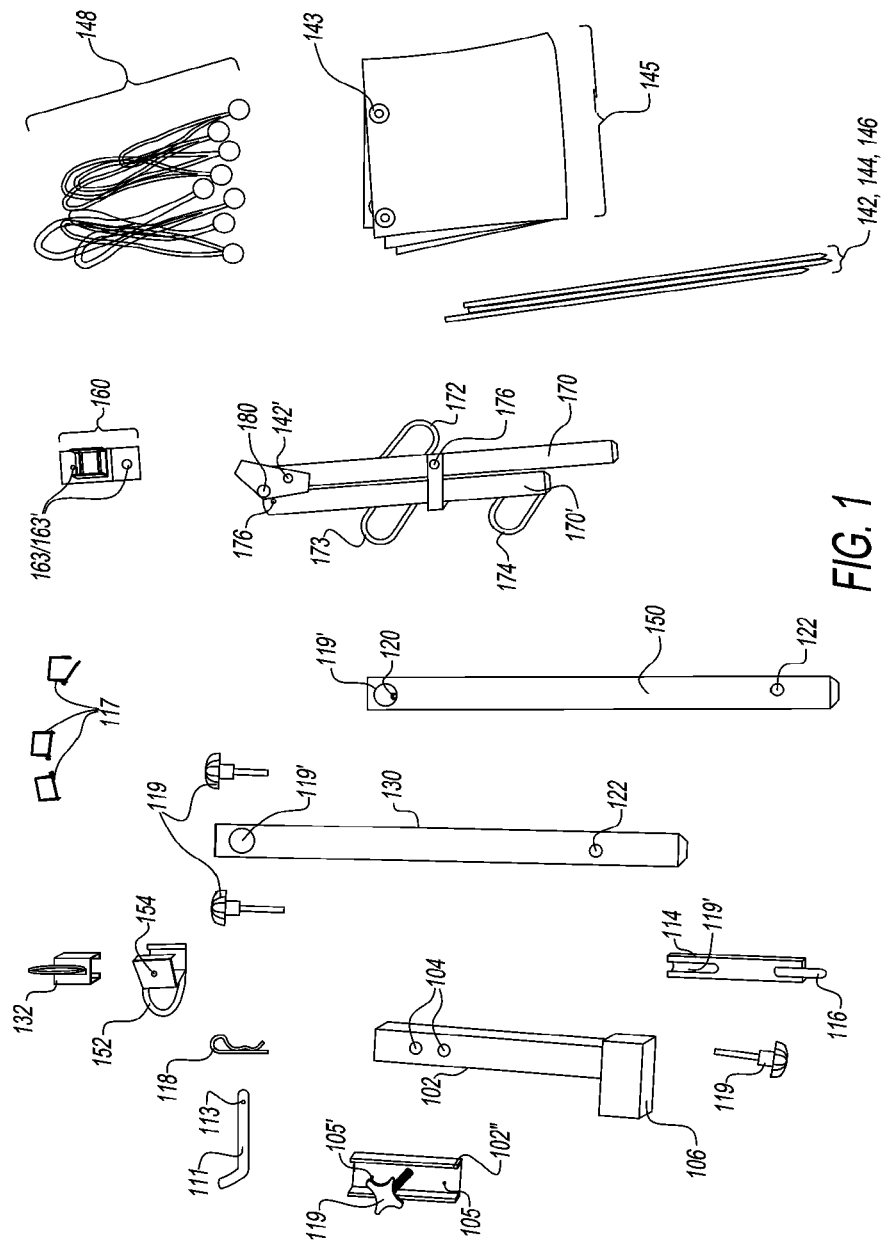
FIG. 1 depicts the collection of components, attachments and accessories for the mobile outdoor gym (MOG).

It will be appreciated that the figures are illustrative and not limiting of the scope of the invention, which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity.

Similarly, not every embodiment need accomplish all advantages of the present invention. The figures are not intended to be exhaustive or to limit the embodiments to the precise form disclosed. It should be understood that various embodiments may be practiced with modification and alteration.

DETAILED DESCRIPTION

The present invention comprises a device or machine for providing mobile outdoor gym equipment, various embodiments of which will now be described more fully hereinafter with reference to the accompanying drawings, in which illustrative embodiments of the invention are shown.

The various embodiments of the invention will now be described more fully hereinafter with reference to the accompanying drawings, in which illustrative embodiments of the invention are shown, so as to enable one skilled in the art to practice the present invention. These, and other, aspects and objects of the present invention will be better appreciated and understood when considered in conjunction with the following description and the accompanying drawings.

It should be understood, however, that the following description, while indicating preferred embodiments of the present invention and numerous specific details thereof, is given by way of illustration and not of limitation. The drawings and following description are exemplary of various aspects of the invention and are not intended to narrow the scope of the appended claims. Many changes and modifications may be made within the scope of the present invention without departing from the spirit thereof and the invention includes all such modifications.

The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the entirety of the present disclosure, use of the articles "a" or "an" to modify a noun may be understood to be used for convenience and to include one, or more than one of the modified nouns, unless otherwise specifically stated.

The present invention comprises a device and simple machine that functions as a piece of mobile outdoor gym training equipment, comprising a modular, rigid spire that attaches to a vehicle hitch or to a wall mount for stability and is configured for use in resistance tube and resistance band weight training.

FIG. 1 depicts the collection of mobile outdoor gym (MOG) components, attachments and accessories, including spire support posts, anchor loops (both fixed and adjustable location loops), backstop protector, and vehicle and wall mount adapters.

Figure 2A:
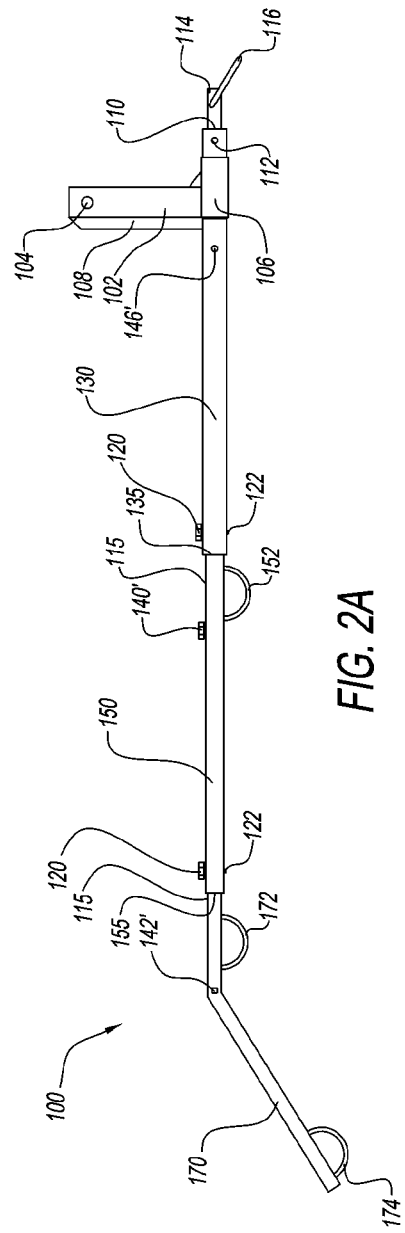
FIGS. 2A-2C depict exemplary (partially) assembled embodiments of the MOG unit.
Figure 2B:
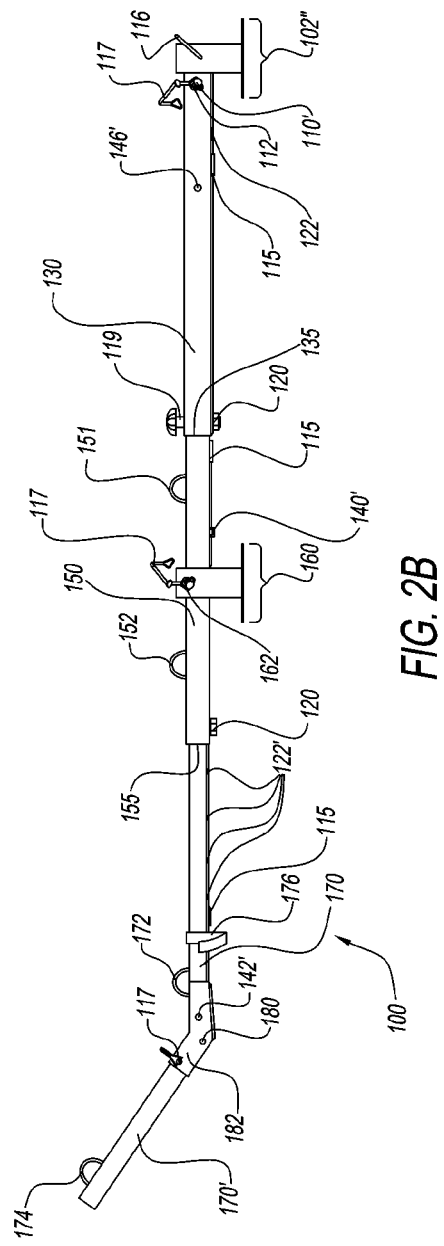
Figure 2C:
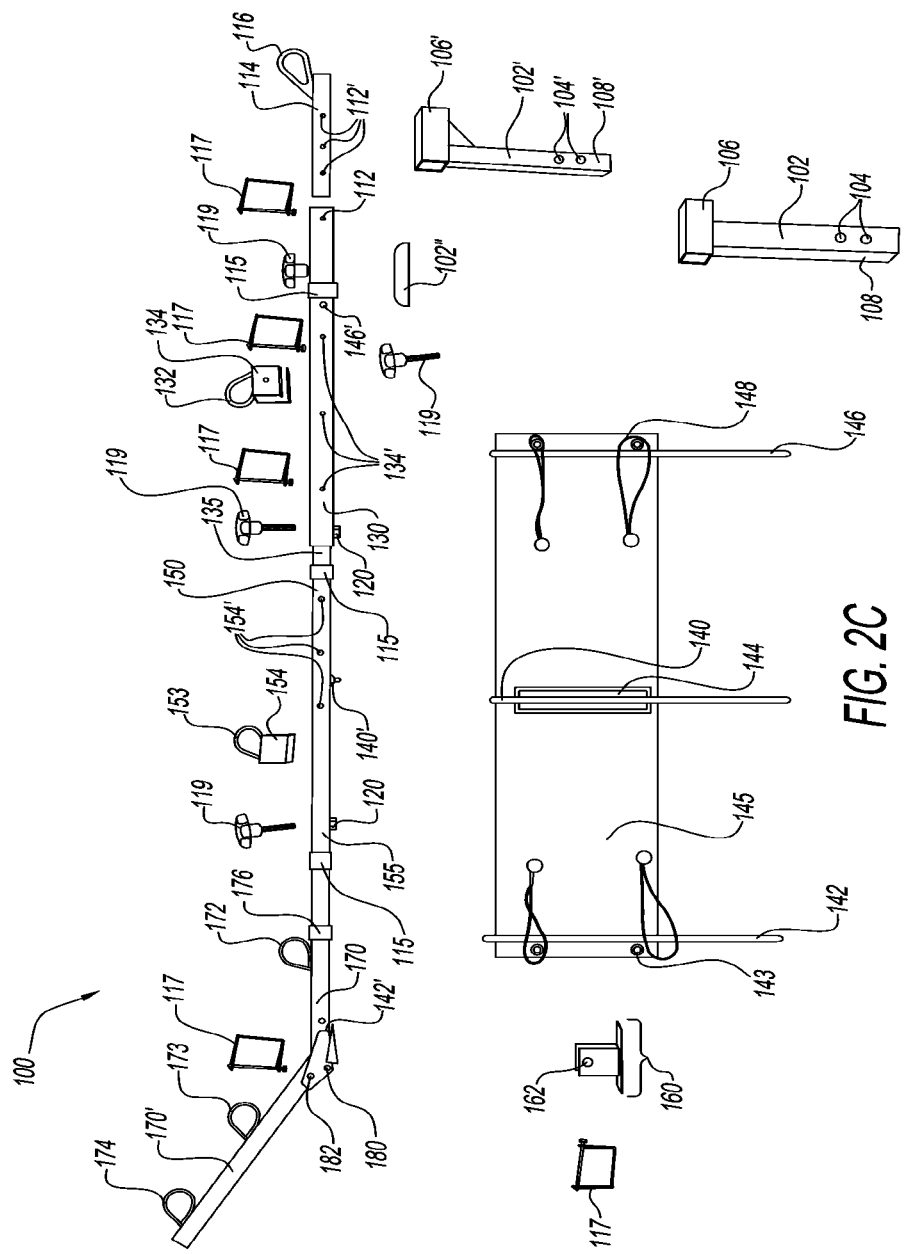
Figure 3A:
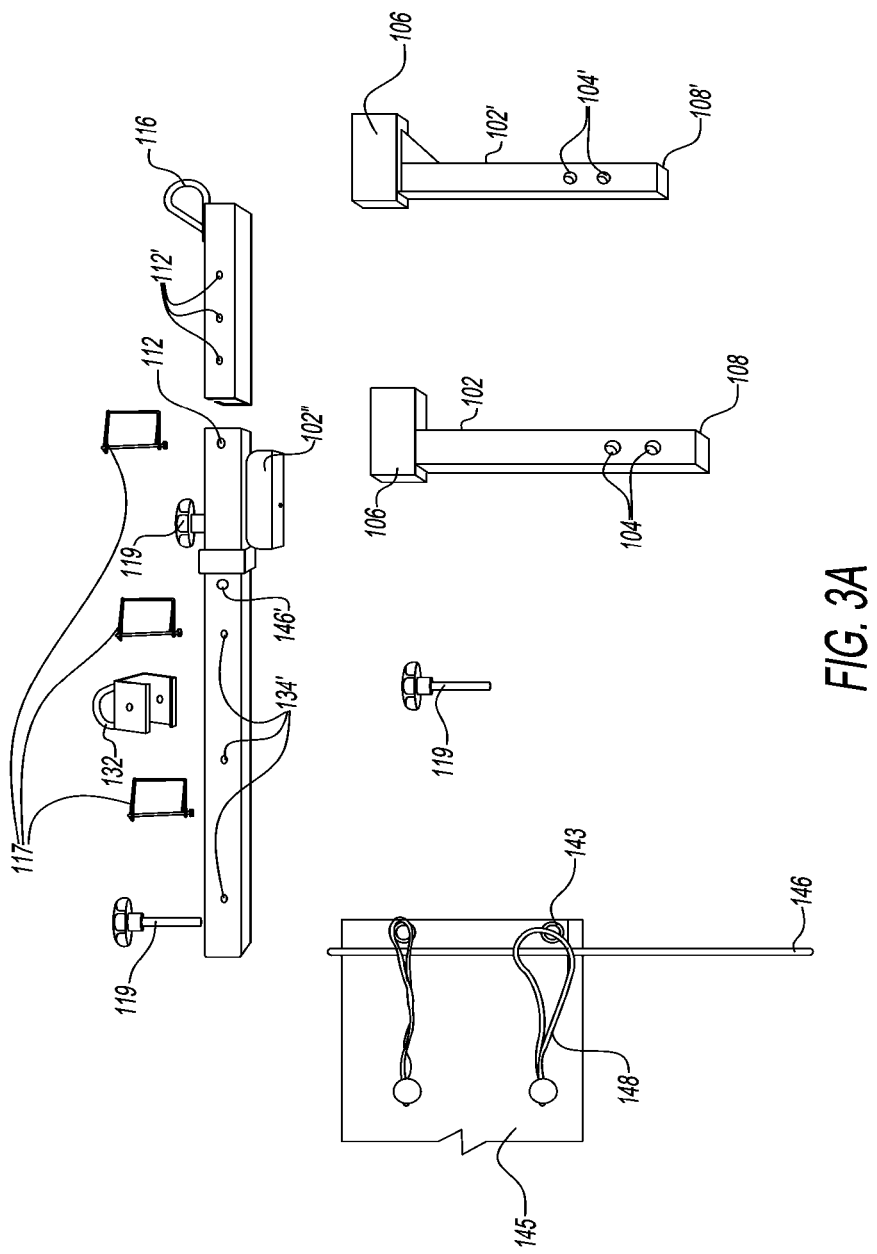
FIG. 3A depicts the base support post, various mounts (e.g., wall and hitch) and the subset of related MOG components, attachments and accessories.
Figure 3B:
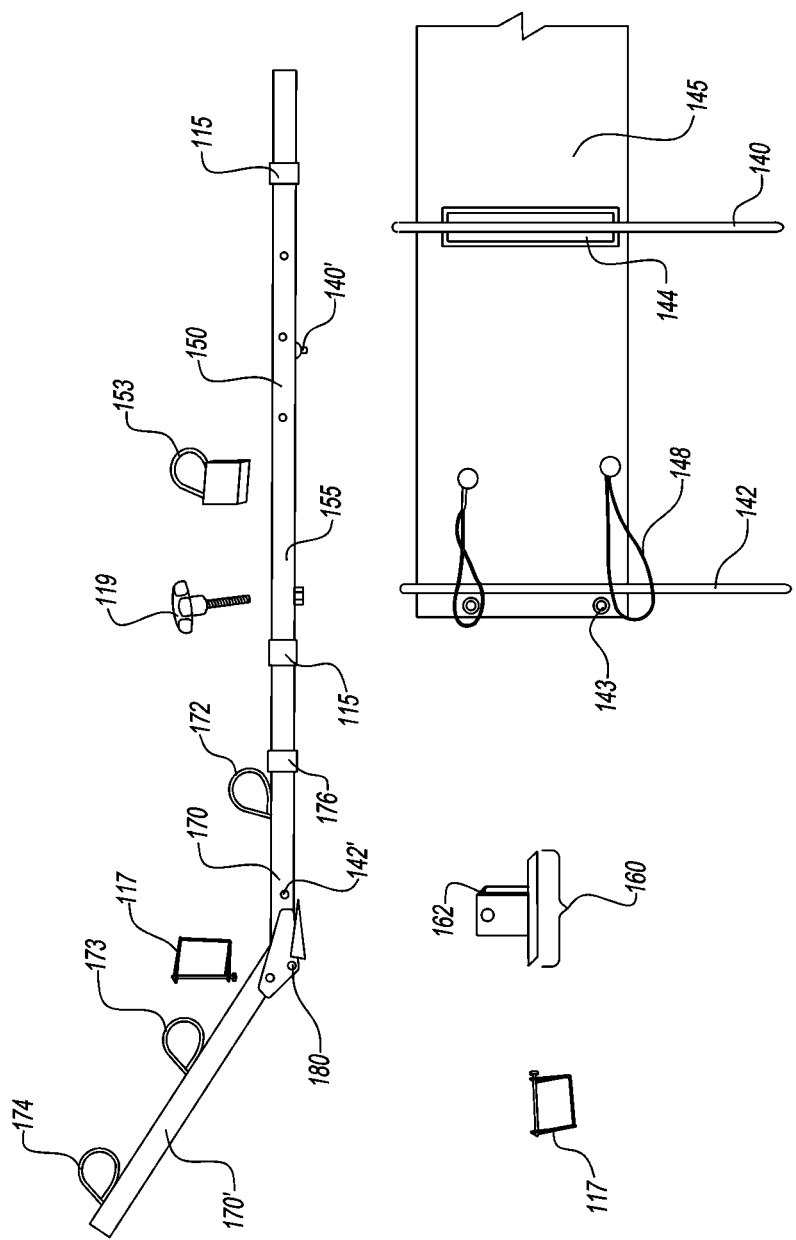
FIG. 3B depicts the middle support post, an upper wall mount, and the subset of related MOG components, attachments and accessories.

FIGS. 2A-2C depict alternate exemplary embodiments of the assembled MOG spire 100. The MOG spire may be made of portions or sections of any square or rectangular tubing, or tubing having any other cross-sectional shape. The tubing may be of any suitable gauge sufficient to prevent bending or excessive flexing of the tubing material.

The tubing may be made from any suitable materials, including any grade or variety of stainless steel, aluminum, or any other alloys of sufficient strength, weight and durability for the purpose. In addition, the tubing may be made of polymer plastics, composite materials such as fiber glass composites and carbon fiber composites.

FIGS. 2A and 2C depict versions having a vehicle hitch mount adapter and FIGS. 2B and 2C depict a wall-mount adapter version. The mounting adapters 102, 102' and 102" serve to anchor the MOG device (e.g., respectively to a vehicle hitch or wall).

As depicted in FIGS. 2B and 2C, in some further alternative embodiments, the adapter may comprise a wall mount adapter 102", configured to mount directly to a wall, or to attach to a separate wall mount piece via a wall mount adapter 102".

A MOG spire 100 may comprise one or more upright support posts. In some preferred embodiments, the MOG spire 100 is comprised of three upright support posts, the upright middle support post 150 fits into and inside of the wider square tubing of the base support post 130, and in turn the top upright support post 170 fits into and inside of the wider square tubing member of the middle upright support post 150, to form the fully assembled MOG spire 100.

Further the base support post 130 may be configured to removably attach or connect to one or more mount adapters, including vehicle hitch mount adapters 102 and 102' and also a wall mount adapter 102".

As shown in FIGS. 4A-4D, for embodiments configured to mount to a wall, wall mount adapters 102" (FIGS. 4A and 4B) and upper wall mount adapters 160 (FIGS. 4C and 4D) are employed to fix and hold in place the MOG spire 100.

Figure 4C:
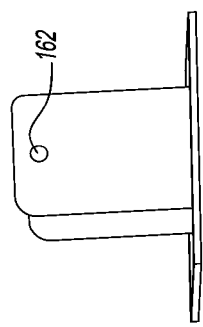
FIGS. 4A-4D depict side and perspective MOG wall mount accessories.
Figure 4D:
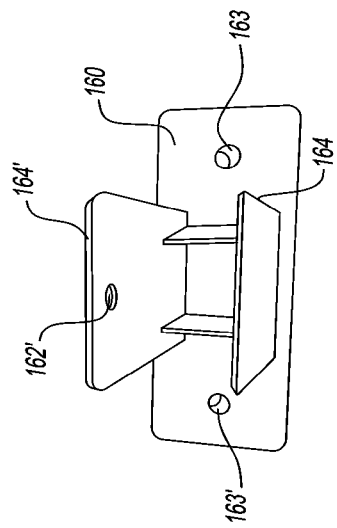
Figure 4A:
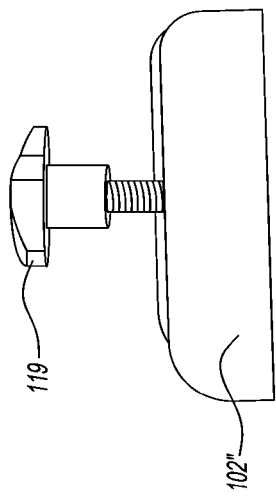
Figure 4B:
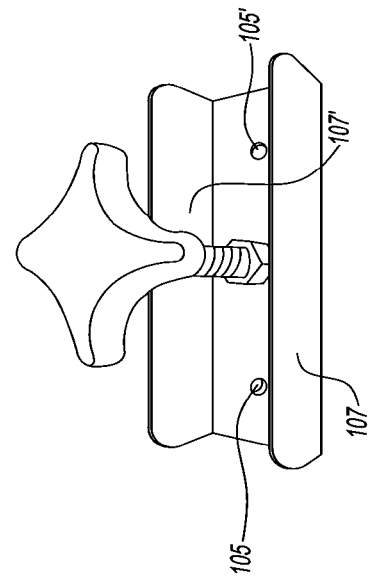
Figure 8B:
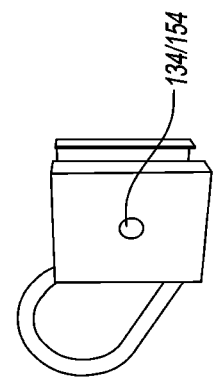
FIGS. 8A-8C depict examples of attachable anchor loops, which may be height adjustable to provide users the ability to reconfigure anchor loop placement on the MOG support spires.
Figure 8A:
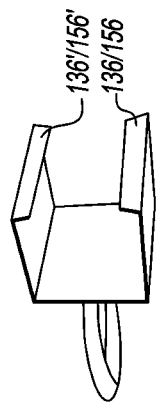
Figure 8C:
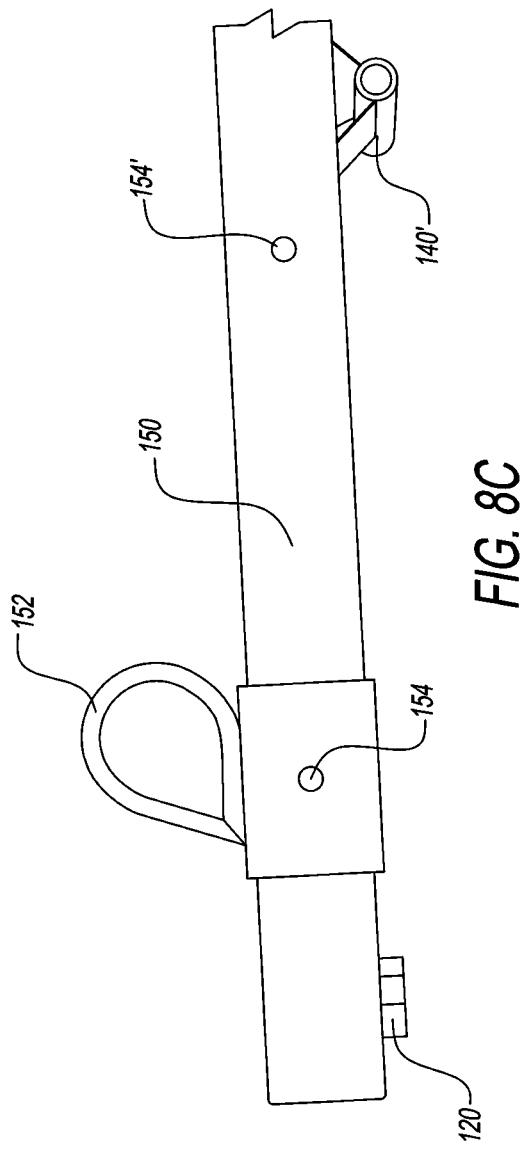
Figure 11B:
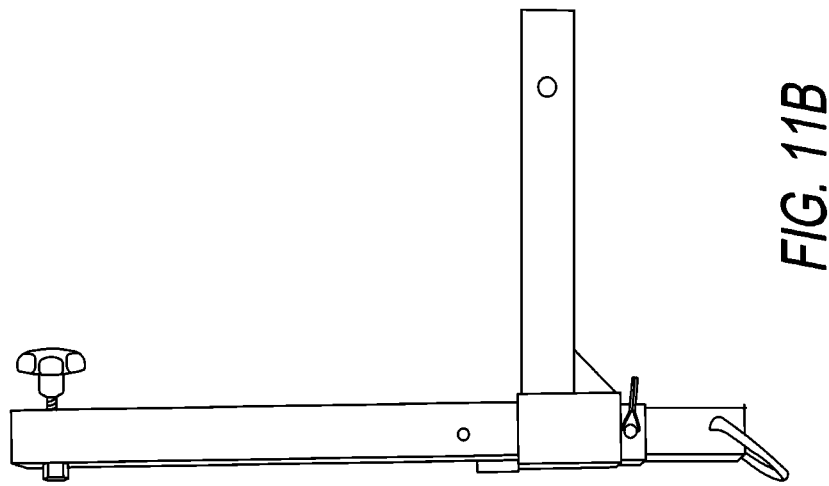
FIGS. 11A-11B depict close up, side views of two exemplary MOG base support posts, connected to exemplary vehicle hitch adapters, with the base anchor loop members inserted and locked into place in the lower portion of the base support member.
Figure 11A:
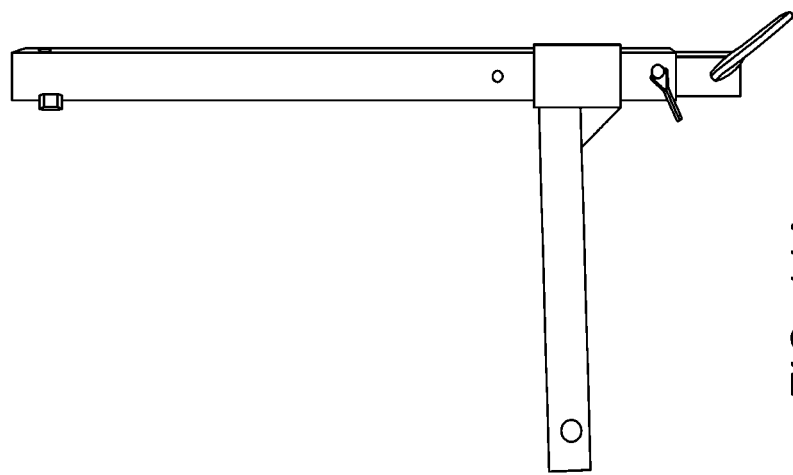
Figure 12A:
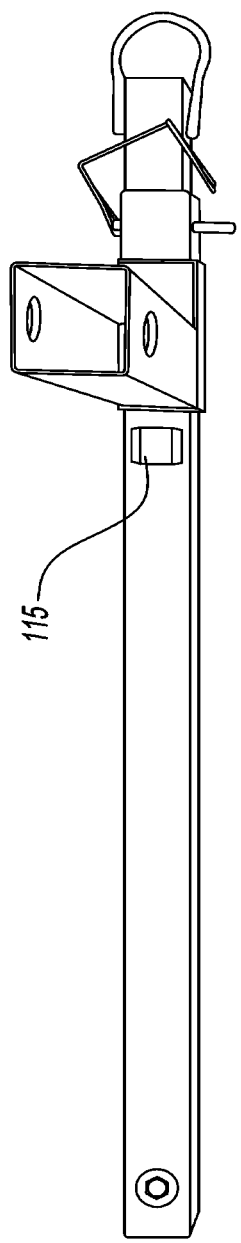
FIGS. 12A-12B depict close up, top down views of the exemplary MOG base support posts, connected to exemplary vehicle hitch adapters, with the base anchor loop members inserted and locked into place in the lower portion of the base support member.
Figure 12B:
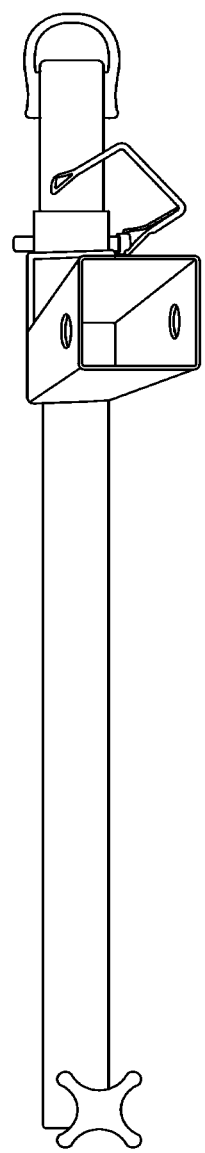

As shown in FIGS. 4A-4B, wall mount adapter 102" may include a star knob bolt 119 or other mechanism for securing in place the base support post 130. The mounting face of the wall mount adapter 102" may include two or more mounting apertures 105 and 105', which serve to anchor the wall mount adapter 102" to a wall, post or other vertical surface. Side walls 107 and 107' further serve to hold the base support post 130 in place.

Further, wall mount adapter 102" may include side wall portions 107 and 107' and a base plate or surface for affixation to a wall, having wall attachment apertures 105 and 105', via which the wall mount adapter 102" may be affixed to a wall via screws, nails or other attachment mechanism. Further, sidewall portions 107 and 107' may further serve to help hold in place the base support post 130.

In preferred alternative wall mounted embodiments, the MOG spire 100 may be further held in place by an upper wall mount adapter 160, which locks the spire in place using a retaining clip lock pin 117 to prevent lateral forces and flexing and hold the spire in position. The upper wall mount adapter 160 may or may not provide any load bearing support.

As depicted in FIGS. 4C and 4D, the upper wall mount adapter 160 may include wall attachment apertures 163 and 163', via which the upper wall mount adapter may be affixed to a wall via screws, nails or other attachment mechanism. Further, sidewall portions 164 and 164' may be provided with receiving clip lock pin apertures 162 and 162', respectively, through which a receiving clip lock pin 117 may be inserted to hold in place the top support post 170 of the MOG spire 100.

Figure 18:
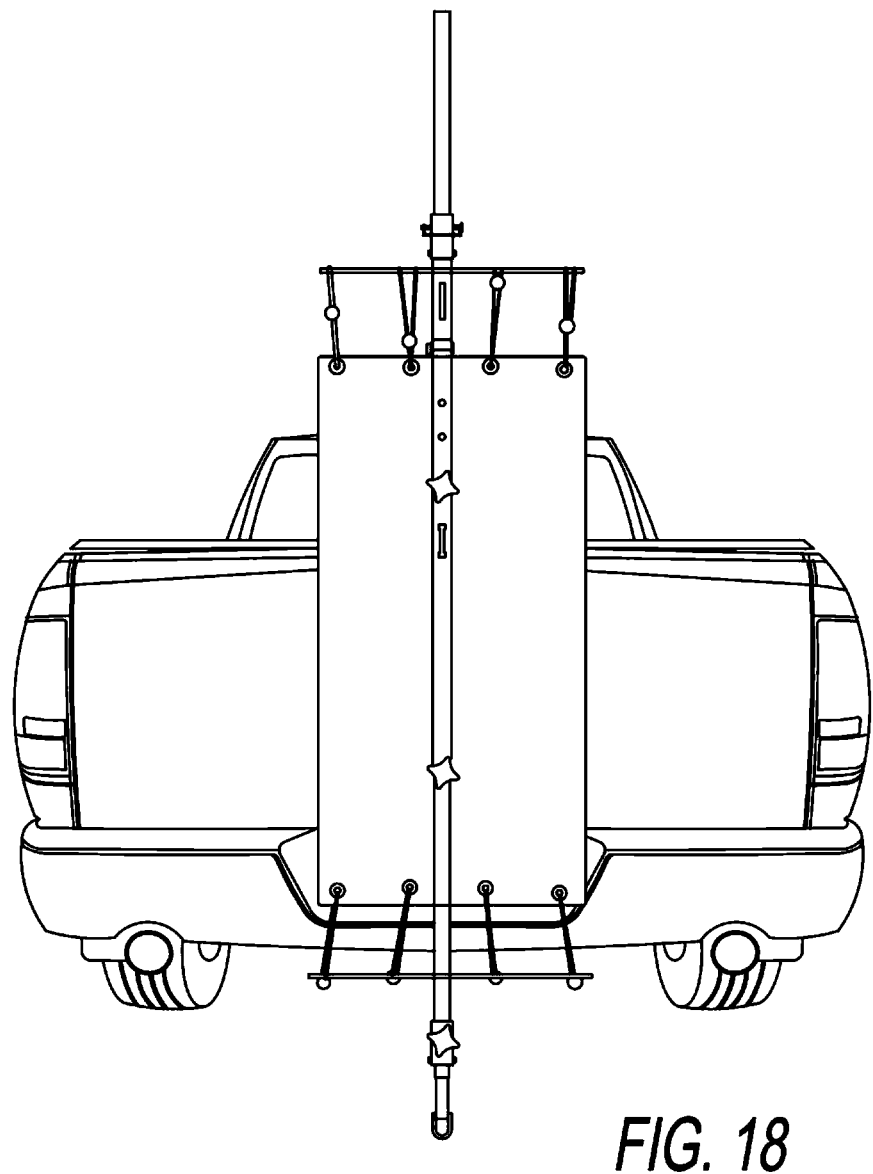
FIG. 18 depicts a head-on view of a fully assembled MOG spire, connected to the hitch on the back of a truck.
Figure 19:
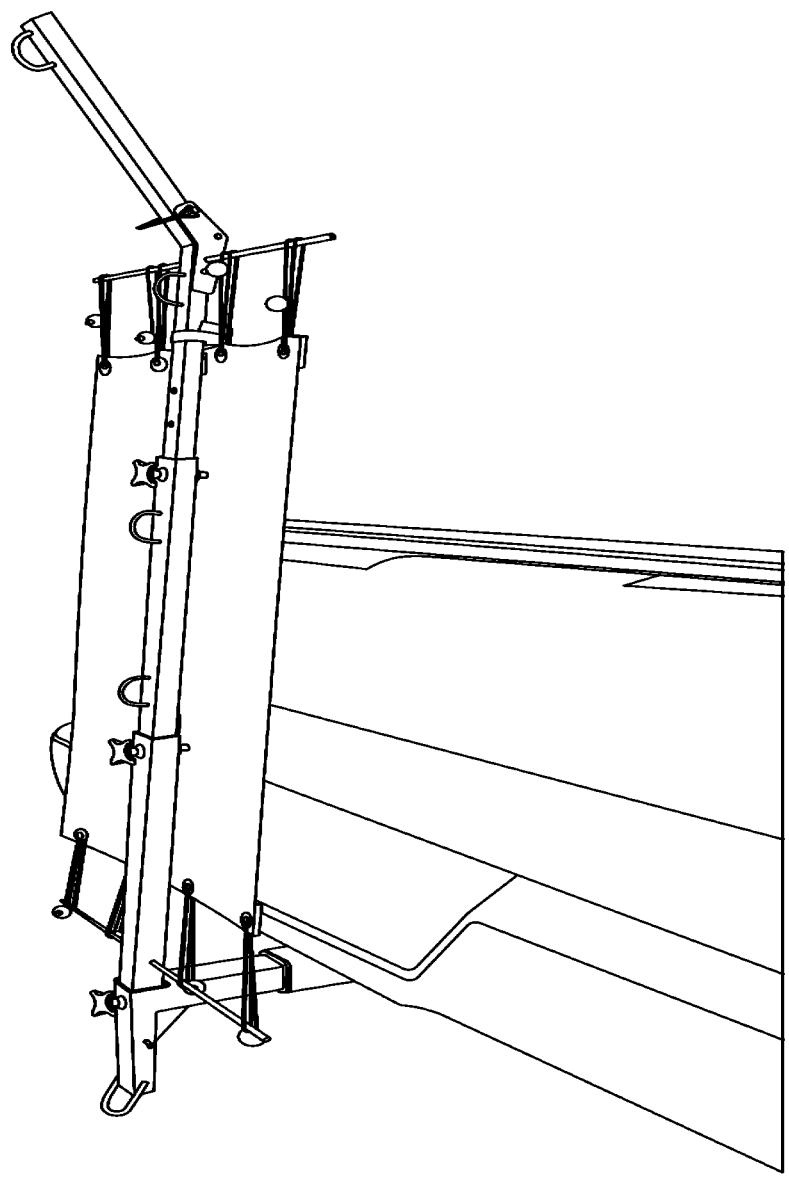
FIG. 19 depicts an angled side-perspective view of a fully assembled MOG spire, connected to the hitch on the back of a truck.
Figure 20:
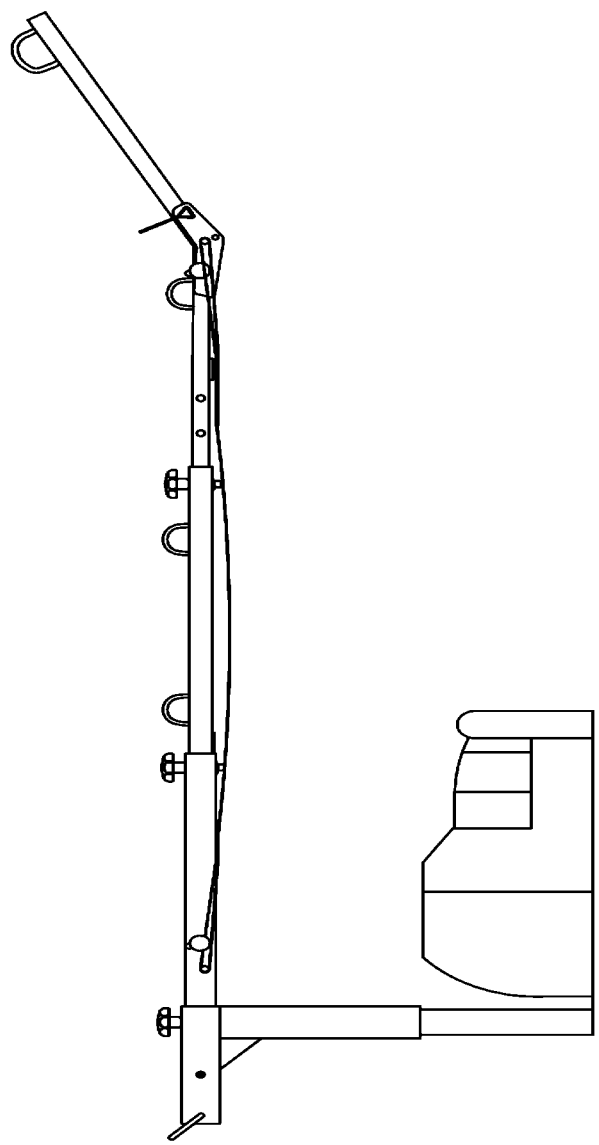
FIG. 20 depicts a side view of a fully assembled MOG spire, connected to the hitch on the back of a truck.
Figure 21:
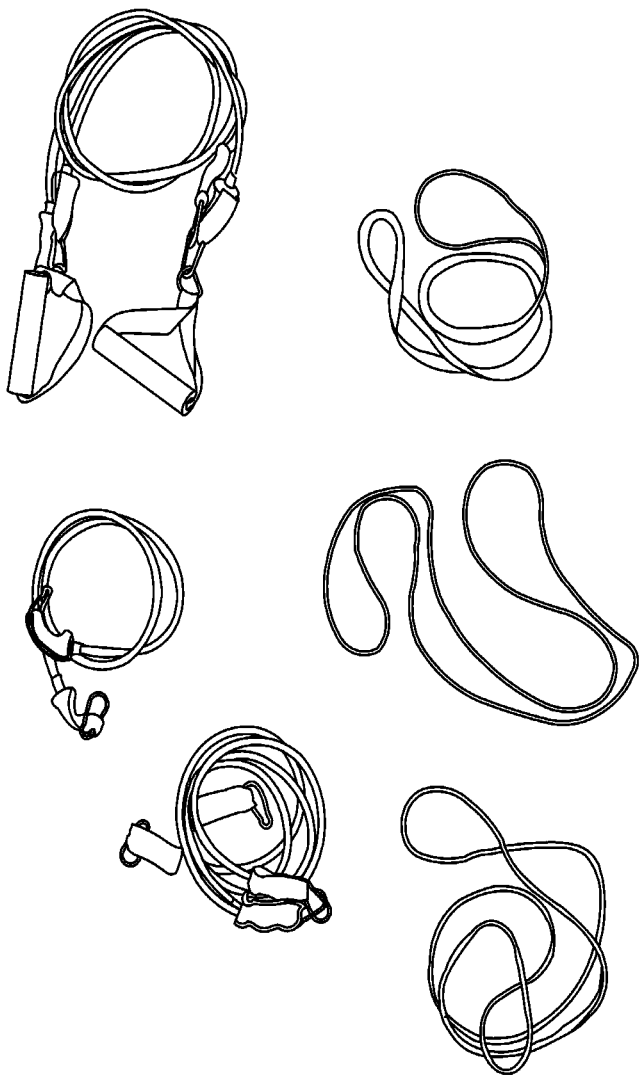
FIG. 21 depicts a variety of resistance tubes and resistance bands for use with the present invention.
Figure 22:
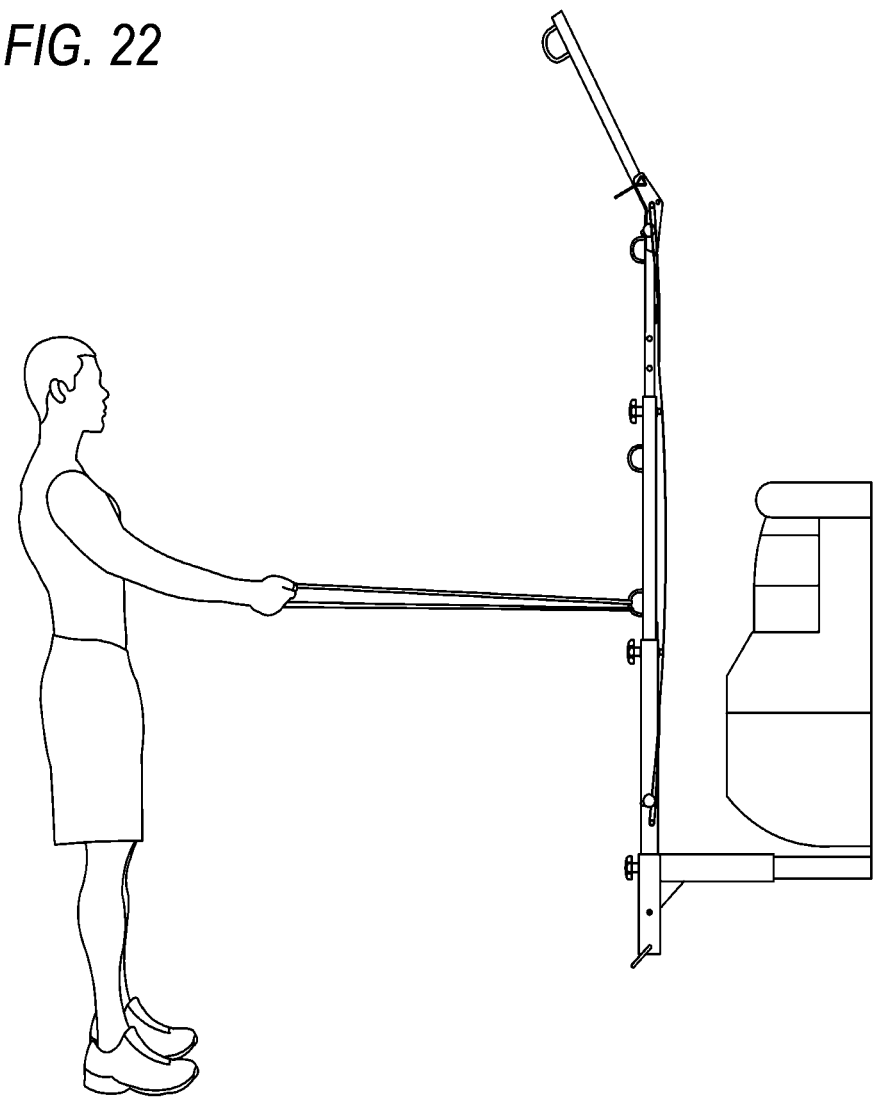
FIG. 22 depicts an exemplary "standing row" resistance weight training exercise, at the starting or relaxed point.
Figure 23:
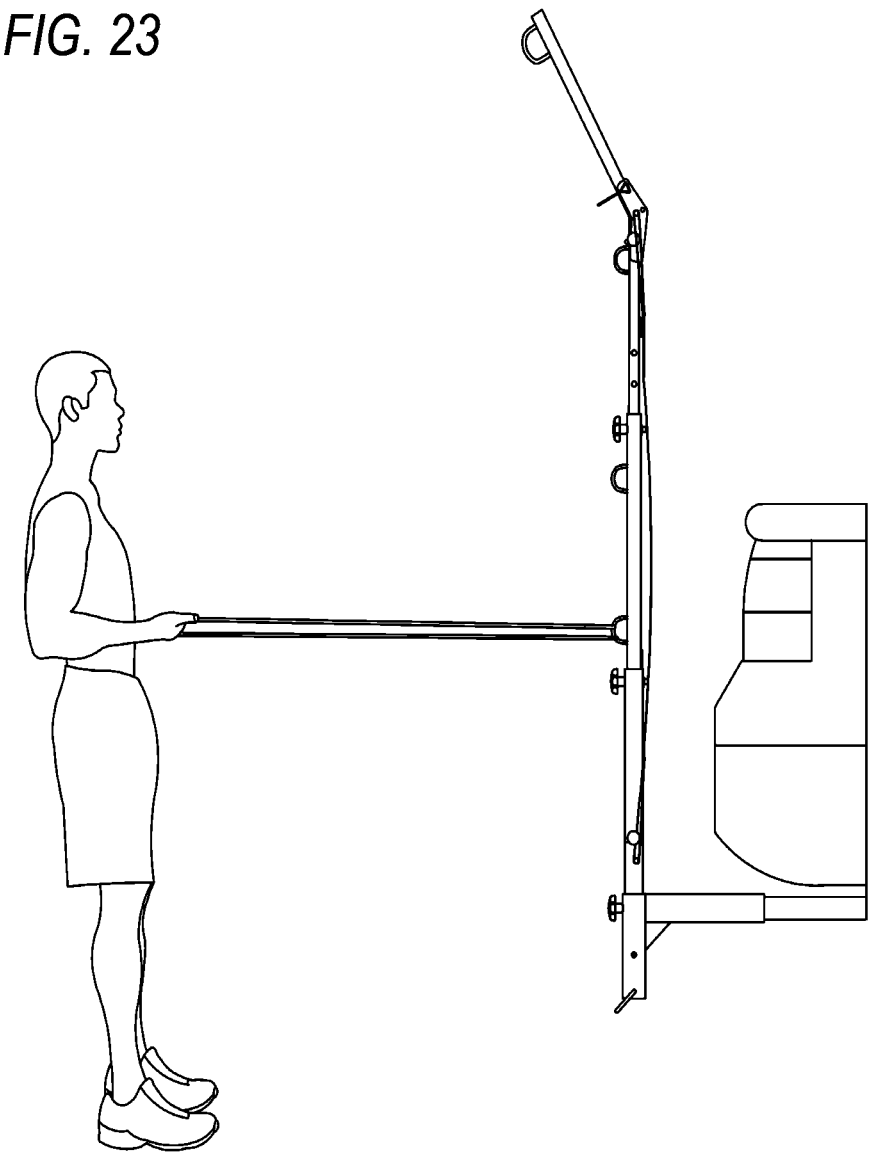
FIG. 23 depicts the exemplary "standing row" resistance weight training exercise, at a midway point.
Figure 24:
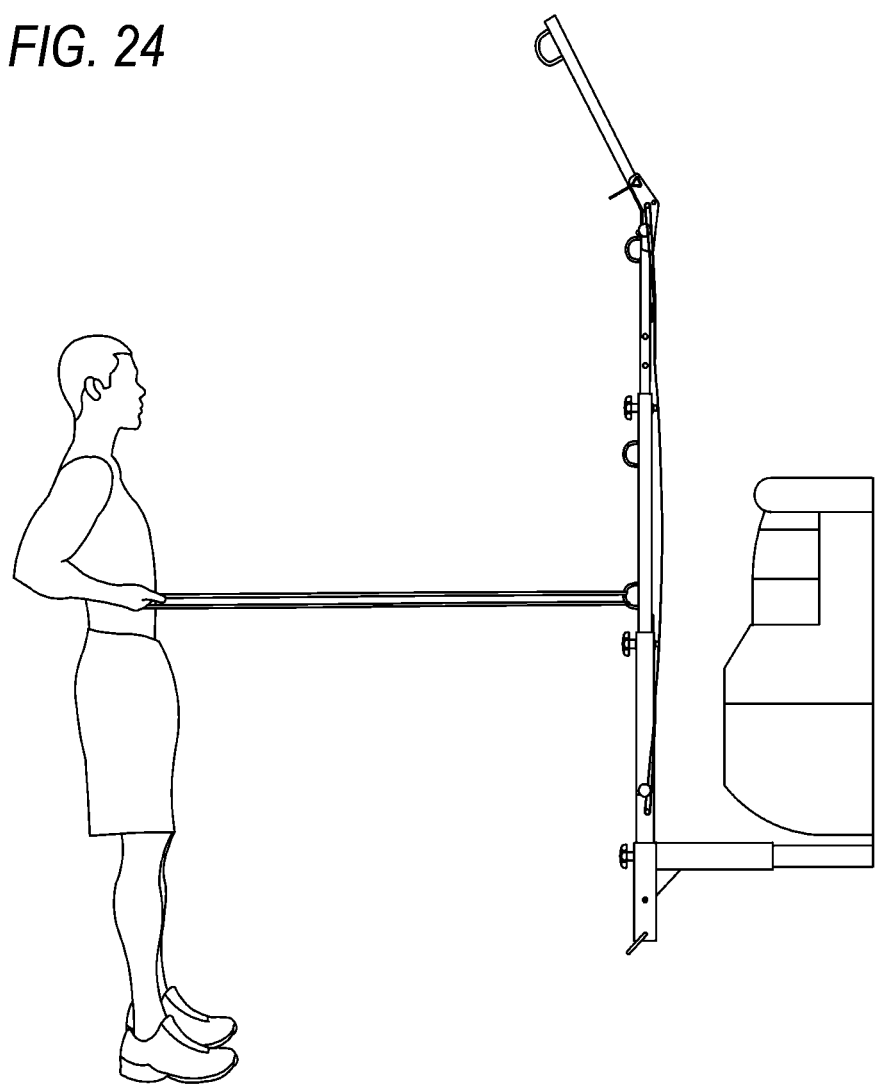
FIG. 24 depicts the exemplary "standing row" resistance weight training exercise, at the stopping point or point of flexion.
Figure 25:
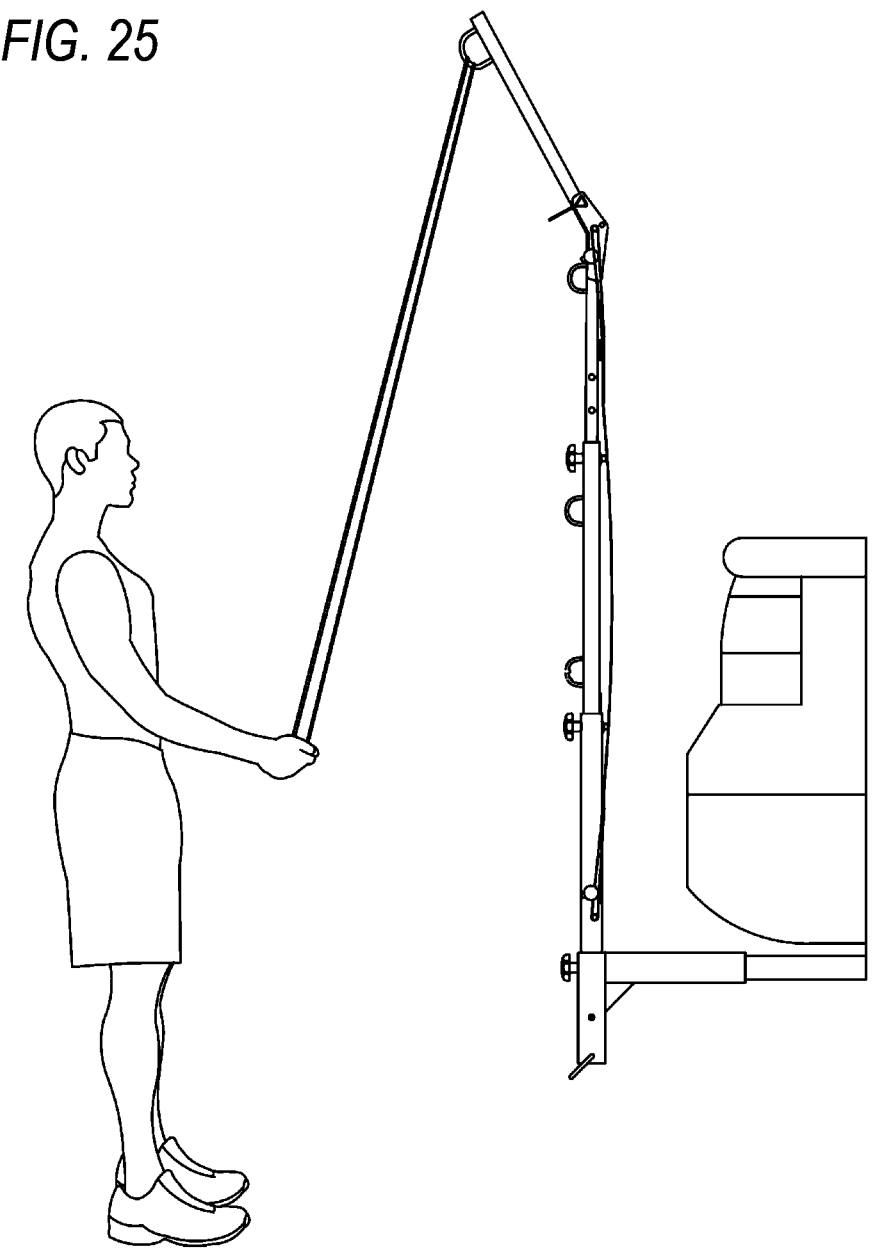
FIG. 25 depicts an exemplary "triceps press down" resistance weight training exercise, at the starting or relaxed point.
Figure 26:
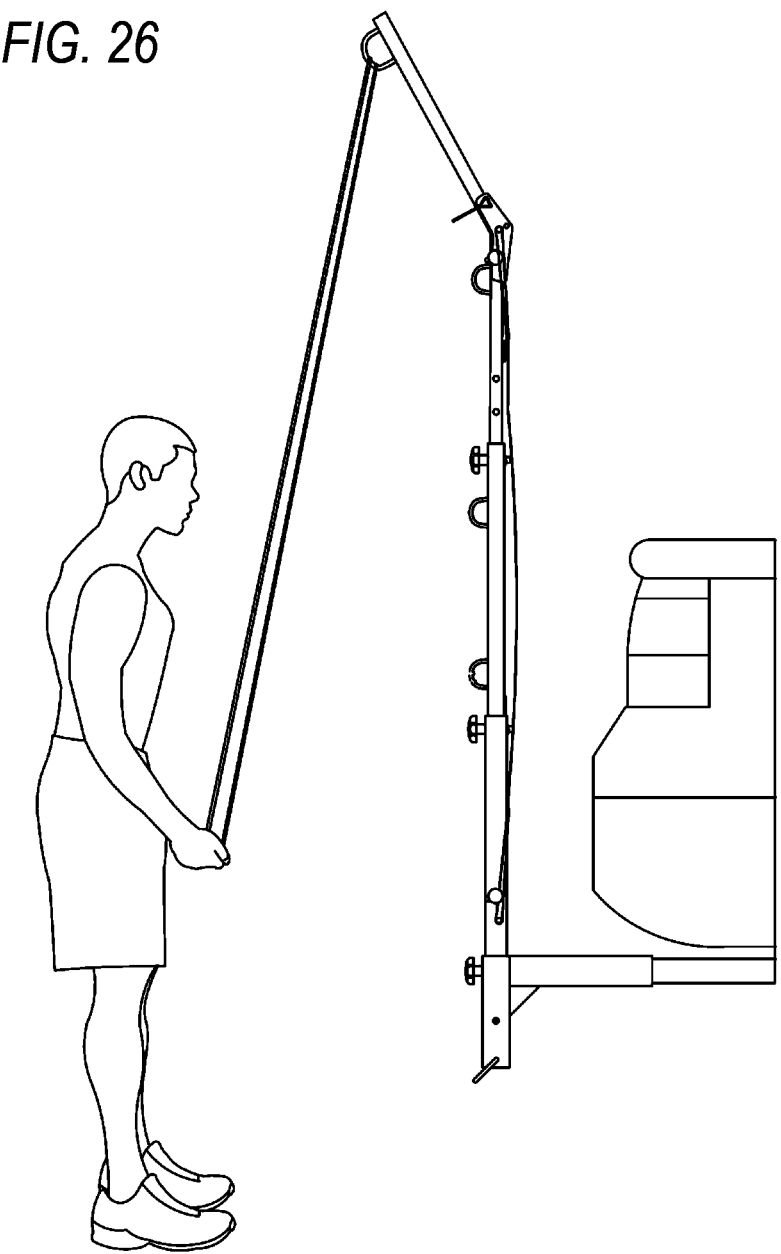
FIG. 26 depicts the exemplary "triceps press down" resistance weight training exercise, at the stopping point or point of flexion.
Figure 27:
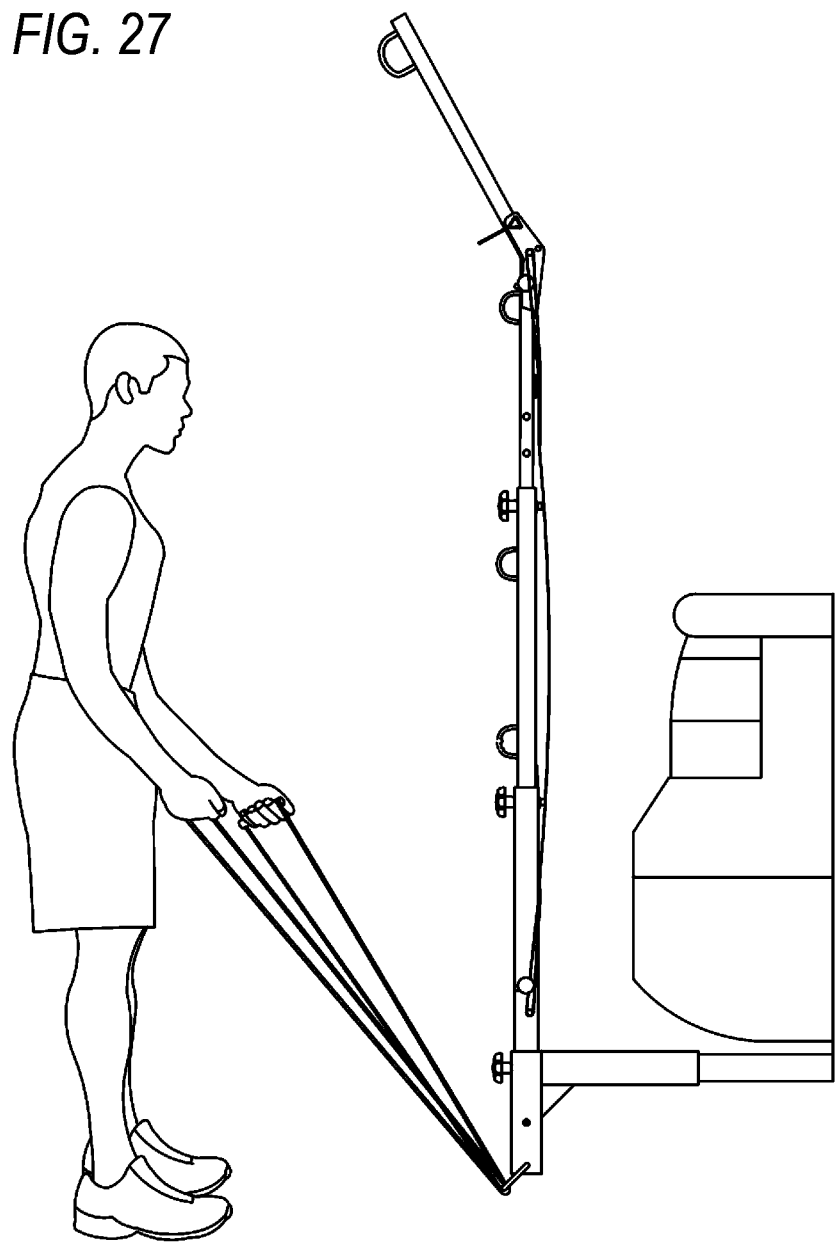
FIG. 27 depicts an exemplary "biceps curl" resistance weight training exercise, at the starting or relaxed point.
Figure 28:
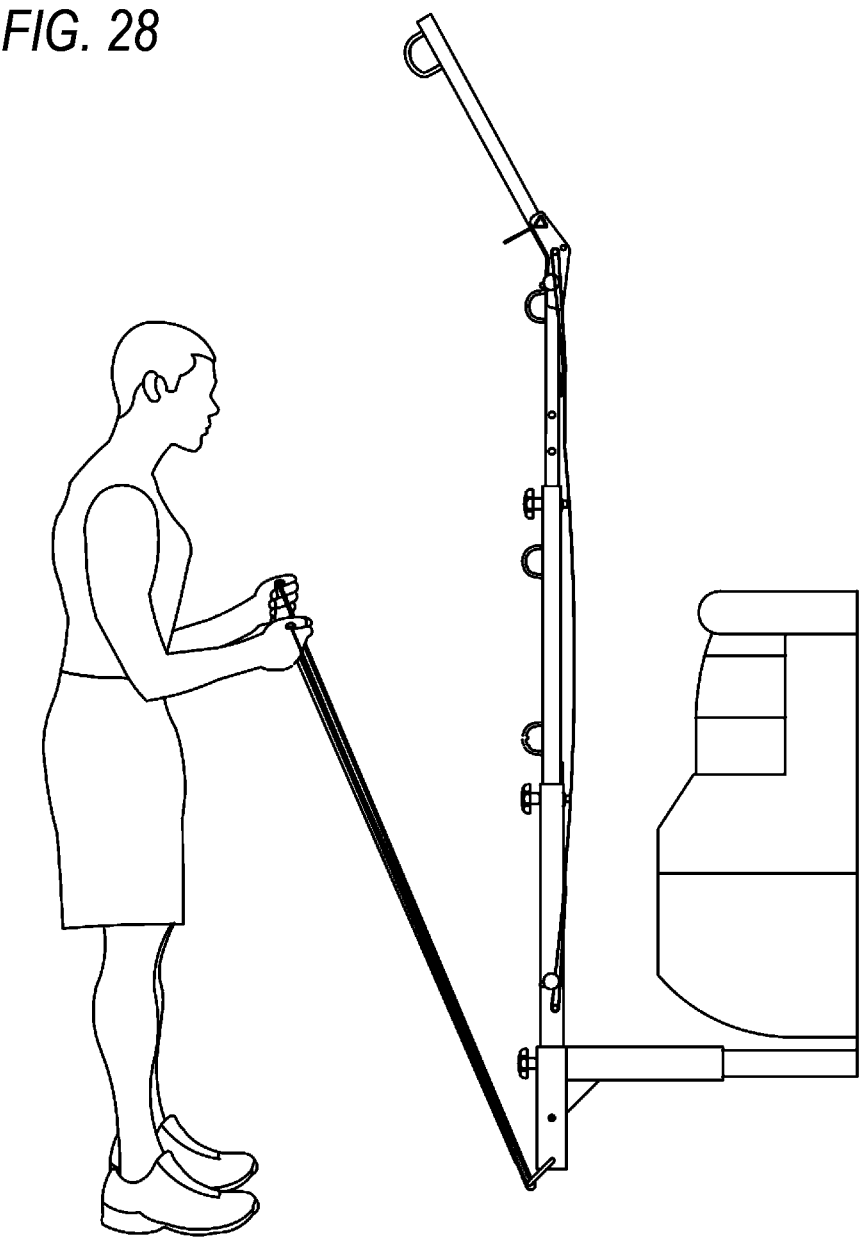
FIG. 28 depicts the exemplary "biceps curl" resistance weight training exercise, at the stopping point or point of flexion.
Figure 29:
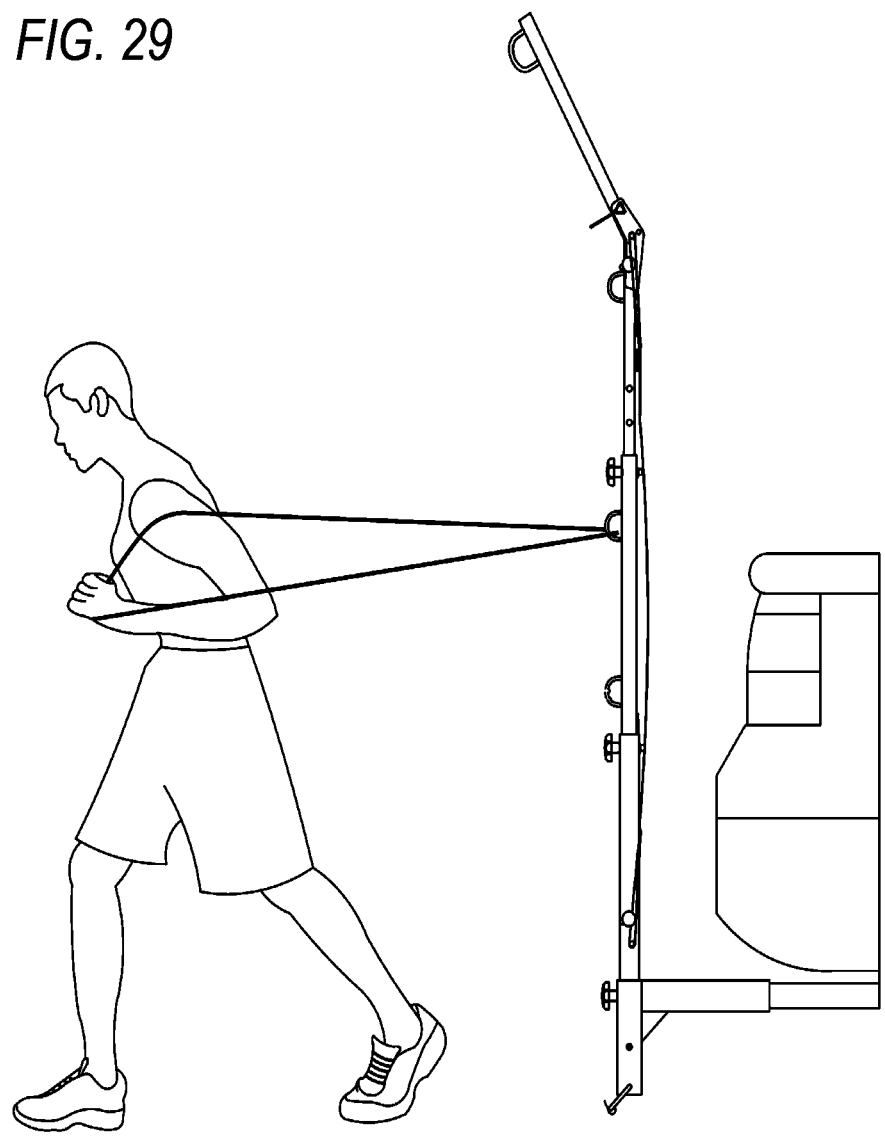
FIG. 29 depicts an exemplary "standing chest press" resistance weight training exercise, at the starting or relaxed point.
Figure 30:
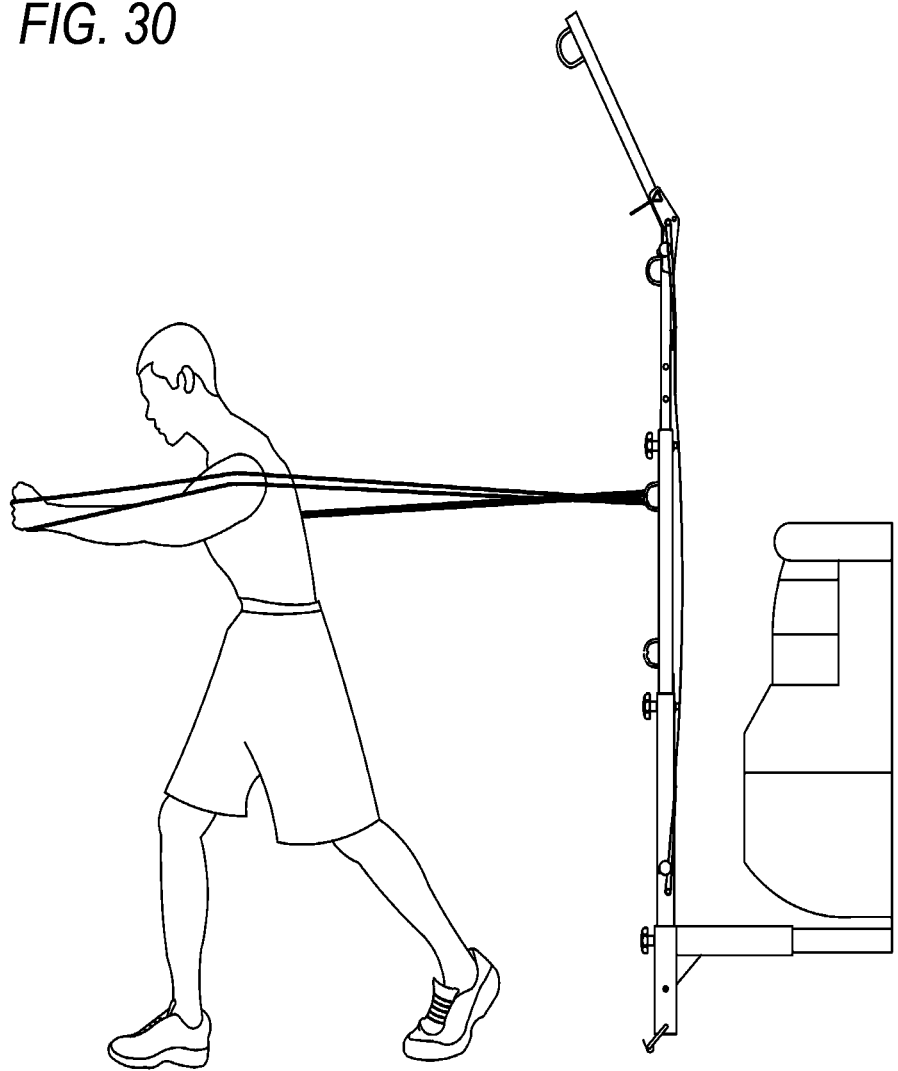
FIG. 30 depicts the exemplary "standing chest press" resistance weight training exercise, at the stopping point or point of flexion.
Figure 31:
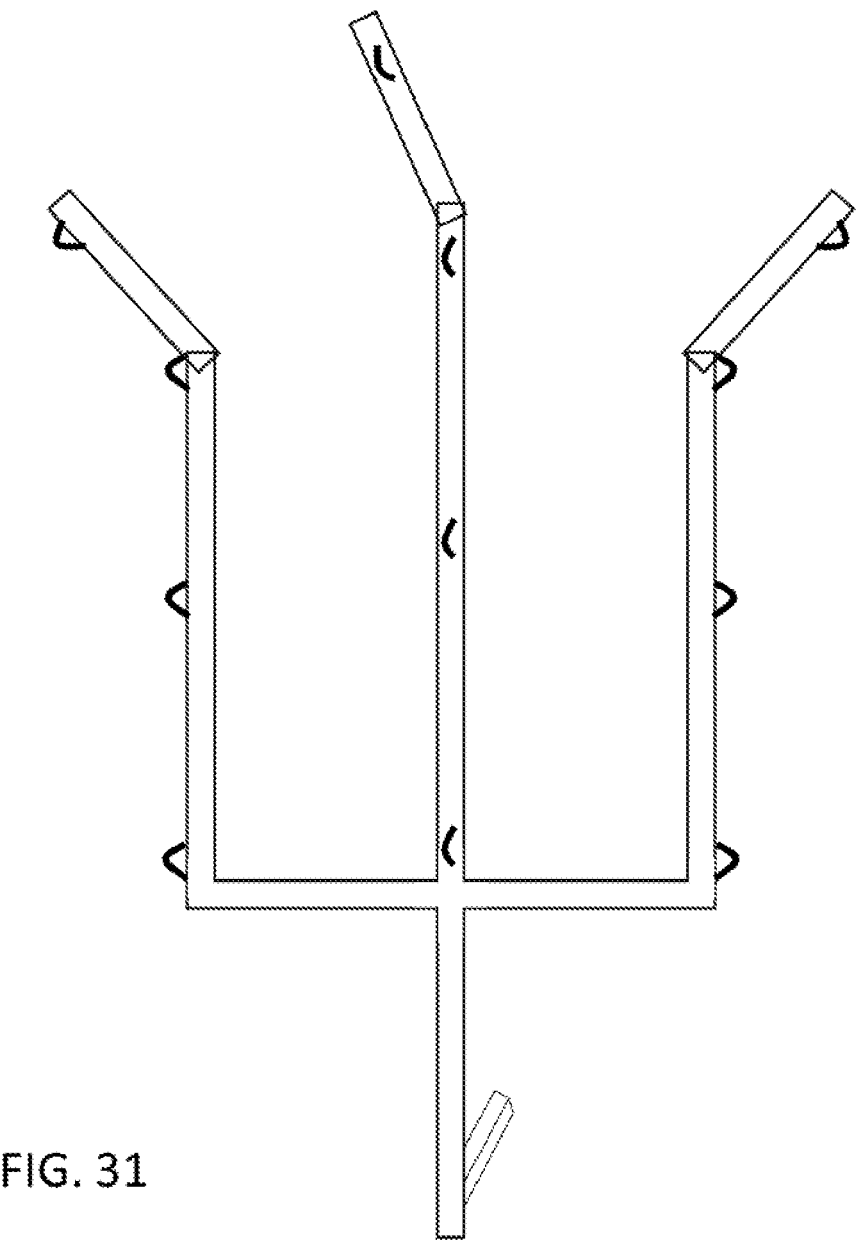
FIG. 31 depicts an exemplary embodiment of the present invention with three vertical spires rather than a single vertical spire, potentially enabling up to three or more people to use the same device for different exercises at the same time.
Figure 32:
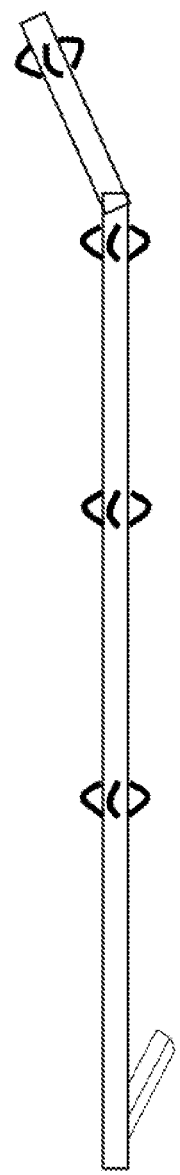
FIG. 32 depicts an exemplary embodiment of the present invention with three sets of anchor loops, rather than a single set of anchor loops, on a single MOG spire, potentially enabling up to three or more people to use the same device for different exercises at the same time.
Figure 33:
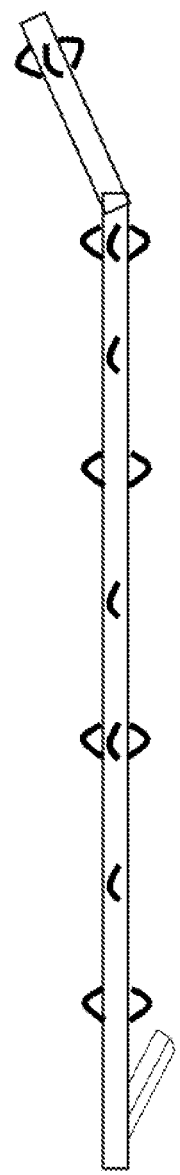
FIG. 33 depicts an exemplary embodiment of the present invention with an alternative configuration of anchor loops, rather than a single set of anchor loops, on a single MOG spire, enabling multiple people to use the same device for different exercises at the same time.
Figure 34:
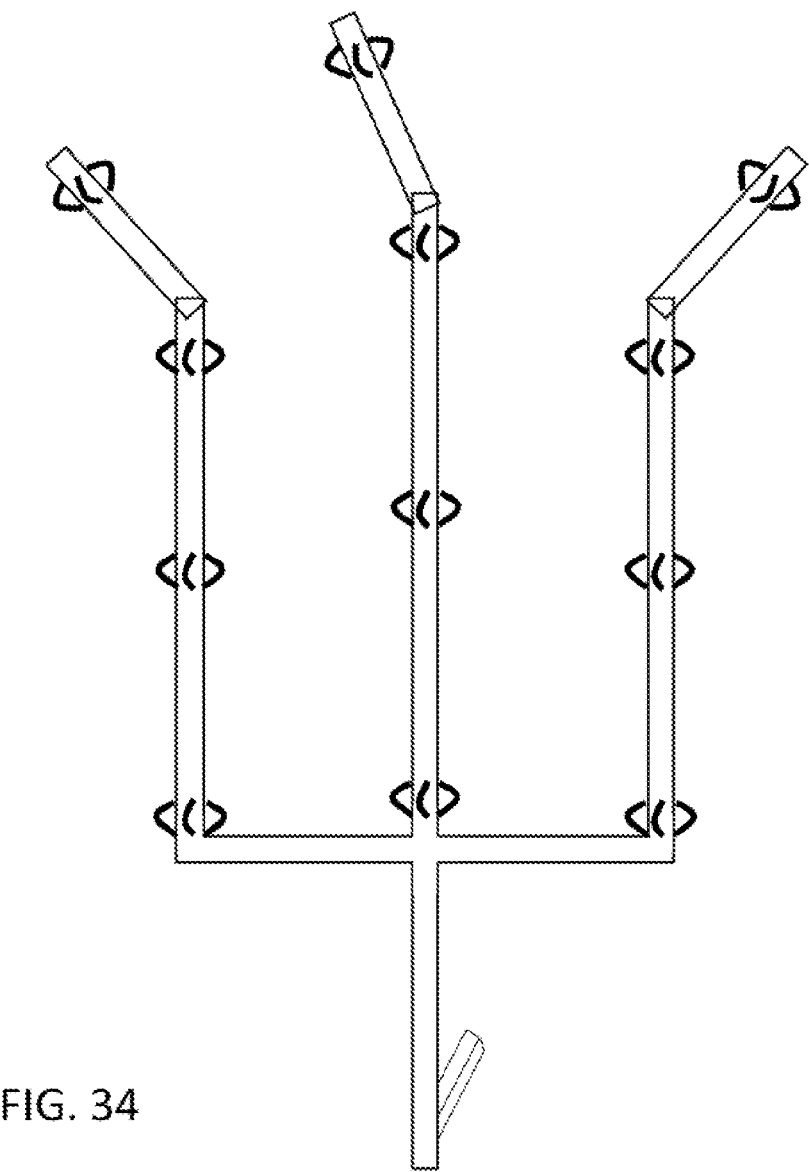
FIG. 34 depicts an exemplary embodiment of the present invention with three vertical spires and multiple anchor loops per spire, potentially enabling up to five or more people to use the same device for different exercises at the same time.

Vehicle hitch mount adapter 102 extends to fit into a vehicle hitch, such as a pickup truck hitch (e.g., see FIGS. 18-20). Vehicle hitches come in different sizes and varieties, with standard hitches available in 1¼", 2", 2½" and 3"

square sizes, and the hitch mount adapter 102/102' may be formed or modified to fit any standard or other type of hitch.

The vehicle hitch mount adapters 102 and 102' may be made of square tubing and have a horizontal portion comprising the vehicle hitch anchor 108 configured to engage the vehicle hitch. One or more hitch pinholes 104 enable the hitch mount adapters 102/102' and a vehicle hitch to be locked into their respective positions, typically with the vehicle hitch anchor 108 within the vehicle hitch, using a hitch pin 111 (FIG. 6E). As shown in FIG. 6E, the hitch pin may further have a locking pin hole 113, configured to receive a locking pin 118 to ensure that the hitch pin does not come loose from the hitch pinhole 104.

Vehicle hitch mount adapters 102/102' are connected to a MOG spire 100, e.g., via a base support post 130. In addition, the hitch mount adapter 102 may have a vertical portion comprising a main connector 106, which receives, stabilizes and locks in place, in an upright position, the base support post 130, comprising a bottom portion or section of the MOG spire 100.

The base support post 130, may comprise a vertical portion of square or rectangular tubing, or tubing having any other cross-sectional shape. In some embodiments, the base support post 130 may be inserted into the bottom opening of and through the main connector portion 106 of the hitch adapter 102.

The base support post 130 may be locked in place, with respect to the hitch adapter 102, via a star knob bolt 119, locking pin 117 or other locking mechanism. In addition, the upper support posts (e.g., middle 150 and top 170 support posts) may further include safety stops or safety collars 115, to prevent misalignment of support post connecting mechanisms (e.g., star knob bolts 119 and welded nuts 120).

In some alternative embodiments, the locking mechanism may comprise one or more depressible locking tabs (e.g., up to four locking tabs, one for each side of the square or rectangular tubing), connected to or forming a portion of the bottom end of the upright support post (e.g., base 130, middle 150, and top support posts 170).

In such embodiments, the depressible locking tabs are inserted into a portion of wider tubing (e.g., a lower support post such as the middle 150 or base 130 support posts) and interlock with a set of one or more appropriately sized openings or apertures (e.g., up to four, one for each side of the square or rectangular tubing) formed in the sidewalls of the lower support post (e.g., base 130 or middle 150 support posts) and configured to receive and engage the locking tabs and lock the upper support post (e.g., top 170 or middle 150 support posts) in place with respect to the lower support post (e.g. base 130 or middle 150 support posts).

Further, the bottom or lower portion of the base support post 130, may protrude through the main connector 106 to extend below the main connector and vehicle hitch. In some alternative embodiments the lower portion of the base support post 130 may include a connecting aperture 112, capable of aligning with connecting apertures 112' of a base anchor loop member 114 and receiving retaining clip lock pin 117, to lock in place the base anchor loop member 114 with respect to the base support post 130.

Figure 13:
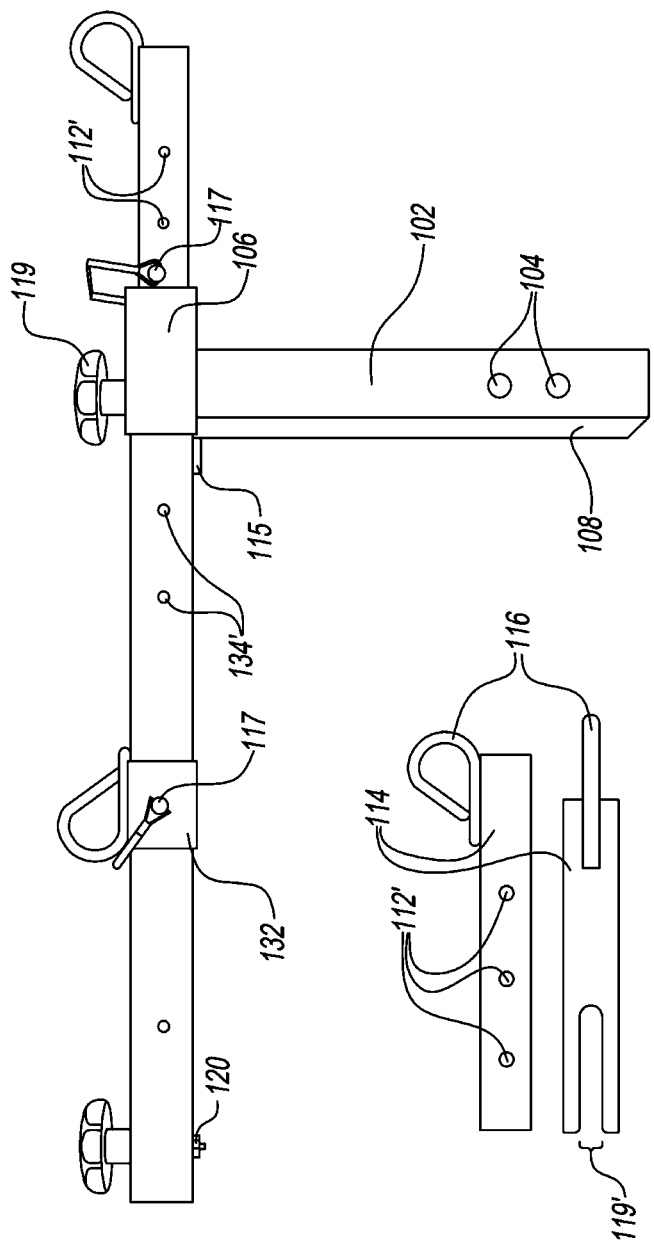
FIG. 13 depicts a close up, side view of an exemplary MOG base support post, connected to an exemplary vehicle hitch adapter, with a base anchor loop member inserted into and locked in place with respect to the lower portion of the base support member.
Figure 14A:
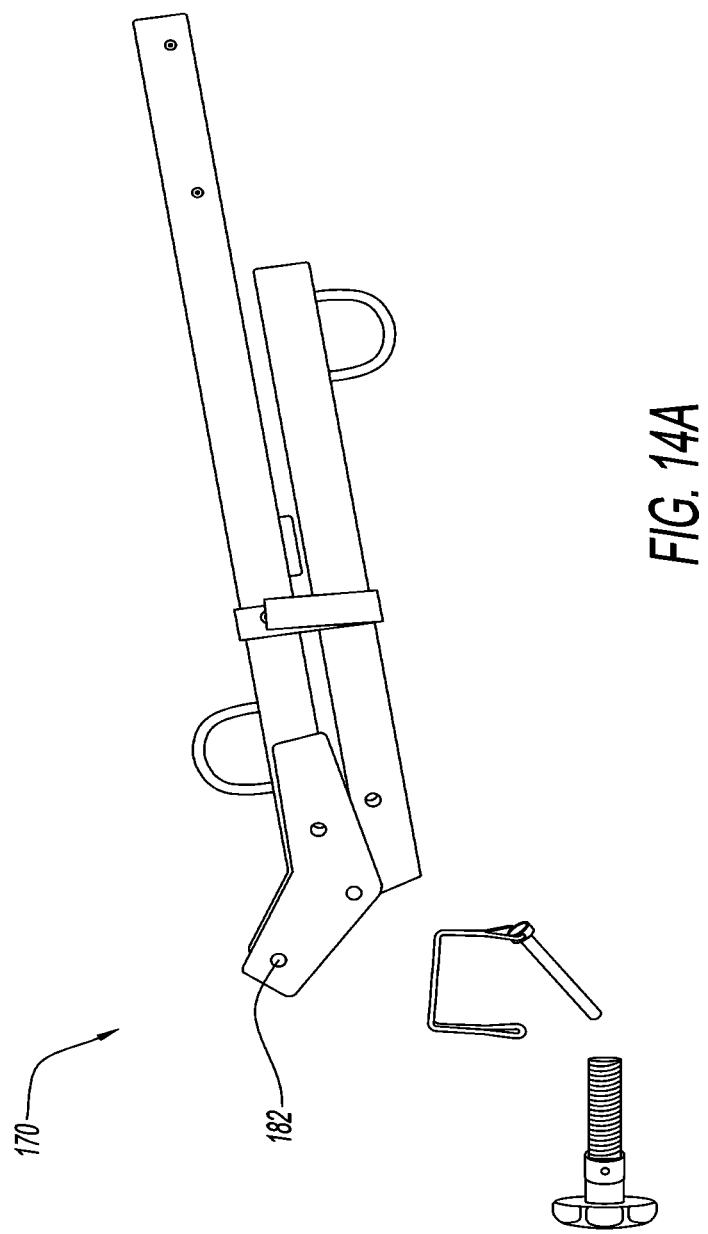
FIGS. 14A-14C depict an exemplary top support post in closed (14A), partially open (14B) and fully extended (14C) configurations.
Figure 14B:
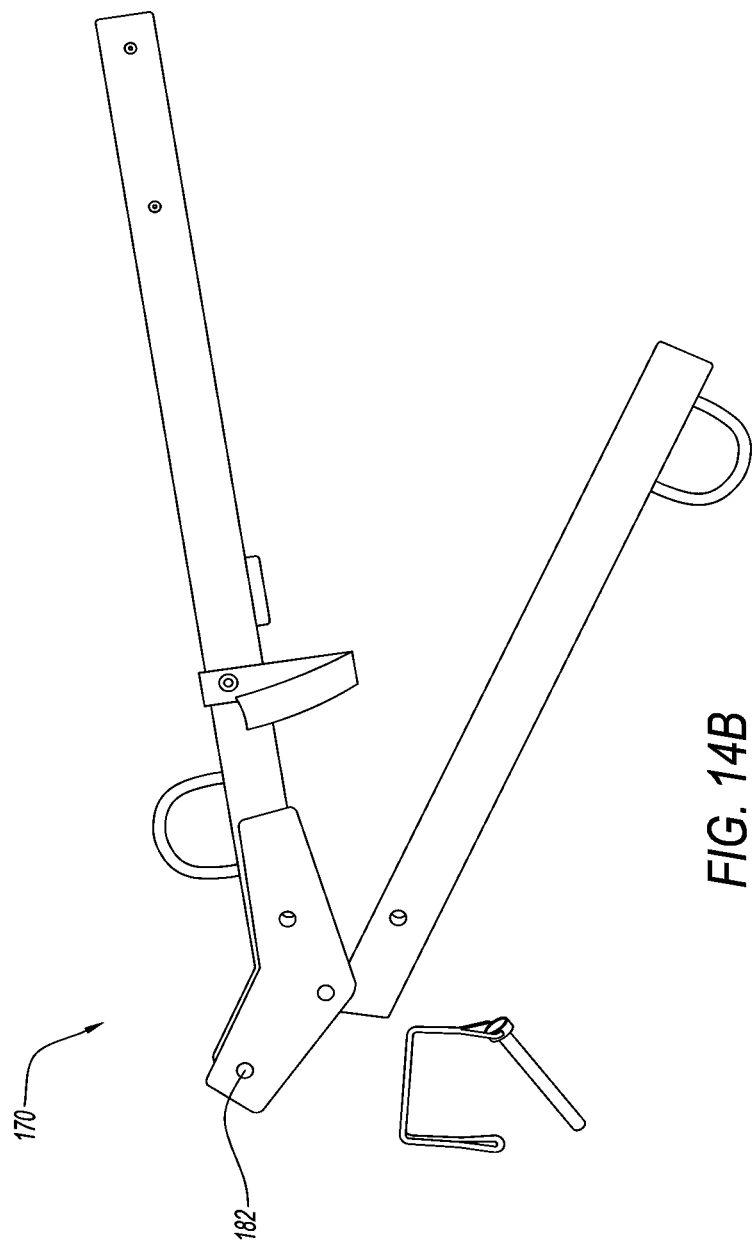
Figure 14C:
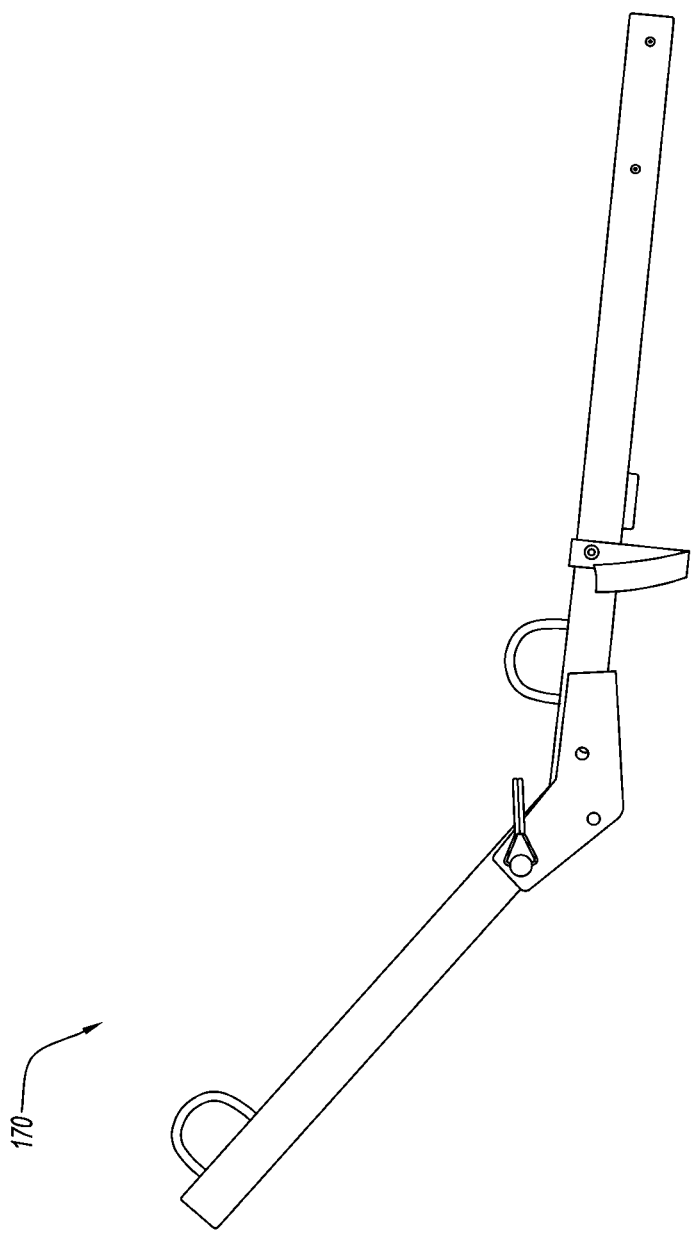

Further, the base anchor loop extension member 114 may also include a star knob bolt cutaway 119' (see FIG. 13), configured to enable the anchor loop extension member 114 to be inserted into the bottom or lower end of the base support post 130 and extend beyond the star knob bolt 119 that engages the main connector 106 of the vehicle hitch adapter 102.

The base anchor loop extension member 114 or the lower end of the base support post 130 itself may further include one or more base anchor loops 116. As described and referred to herein, anchor loops (e.g. 116, 132, 151, 152, 153, 172, 173, 174) may serve to anchor one or more resistance bands or tubes, ropes for rope training, or other types of training or exercise equipment benefiting from access to an anchor point.

Adjustable anchor loops, 132 and 153 have connection apertures, 134 and 154 respectively, and retaining lips or edges 156 and 156' that serve to wrap around the respective support post (130 and 150) and ensure that the anchor loops 132/153 may slide along, but not disengage from the support post. Each respective support post may have one or more connection apertures (e.g., 134' and 154') that serve to enable the adjustable anchor loop to be attached and releasably affixed to the support post at various respective heights, according to the placement of the connection apertures 134' and 154'.

The upright support posts of the MOG spire 100 fit one into another, the thinner, upper portions of tubing fitting into, resting inside of and locking into place with respect to the lower portions of support post tubing. Star knob bolts 119 and/or retaining clip lock pins 117, may be used to lock the upright support posts and the various accessories and attachments into their respective positions.

As shown in the figures, each upright support post has a star knob bolt 119 and welded nut 120 that functions as a bolt position-locking mechanism, holding the next upright support post in place, within the lower upright support post. For each star knob bolt 119, a female threaded nut 120 may be welded onto the opposite side of the wider square tube, configured to receive and lock in place the male threaded bolt portion of the star knob bolt 119 once it passes through the alignment bolt holes 122 of the inner and outer square tubes. The vehicle hitch mount adapter 102/102' may further have a star knob alignment aperture 121.

The base upright support post 130 engages with a wall mount adapter 102" or the main connector portion 106 of a hitch mount adapter 102/102'. The base support post 130, fits into the main connector portion 106. The middle upright support post 150 fits into the base upright support post 130 at the middle-base upright support post junction 135.

The top support post 170 fits into the middle upright support post 150 at the top-middle upright support post junction 155. Again, the alignment safety stops 115 and alignment safety collars 115 prevent the upper support posts from inserting too far into the lower support posts and ensures alignment of the connection mechanisms.

At each junction (e.g., 155, 135, 106, 110), the inserted post includes an alignment safety stop 115 (FIGS. 9A-9C) or an alignment safety collar 115 (FIGS. 2C, 3A, 3B, 5A and 5B), which prevents the thinner portion of tubing from being inserted too far into a portion of wider tubing and ensures alignment of the support post connecting mechanisms (e.g., star knob bolts 119 and welded nuts 120).

In other embodiments of the present invention, the MOG spire may comprise any number of upright support posts (e.g., 170, 150 and 130), and in certain preferred embodiments one or more of the upright support posts may each include one or more anchor loops (e.g., 116, 132, 151, 152, 153, 172, 173, 174). A base support post extension member 114 and base anchor loop 116 may be located at the bottom of the base upright support post 130, with the extension member fitting into or onto the lower portion of the base upright support post 130 at base-extension junction 110.

In certain embodiments, the anchor loops may comprise anchor "hooks" with at least one end unattached to the upright support post. As seen in the alternative embodiments depicted in FIGS. 2A and 2B, the base upright support post 130 may fit into a wider main connector portion 106 or it may fit onto a thinner main connector portion at the base support post wall mount adapter intersection 110'. Preferred alternative embodiments may also include variable height adjustment holes 122', configured to lock the top upright support post 170 in place at various different heights for variable height adjustment.

In additional preferred embodiments, the top upright support post 170 may include a top folding portion or cantilever arm 170', configured to rotate about an axis defined by a cantilever hinge 180 to position the top folding portion or cantilever arm 170' at an angle of between 15 degrees to 85 degrees from vertical. Cantilever arm connection aperture 182' aligns with a cantilever hinge connection aperture 182, located just above the cantilever hinge 180 (see FIGS. 14A-14C, 15B and 15C).

Figure 15C:
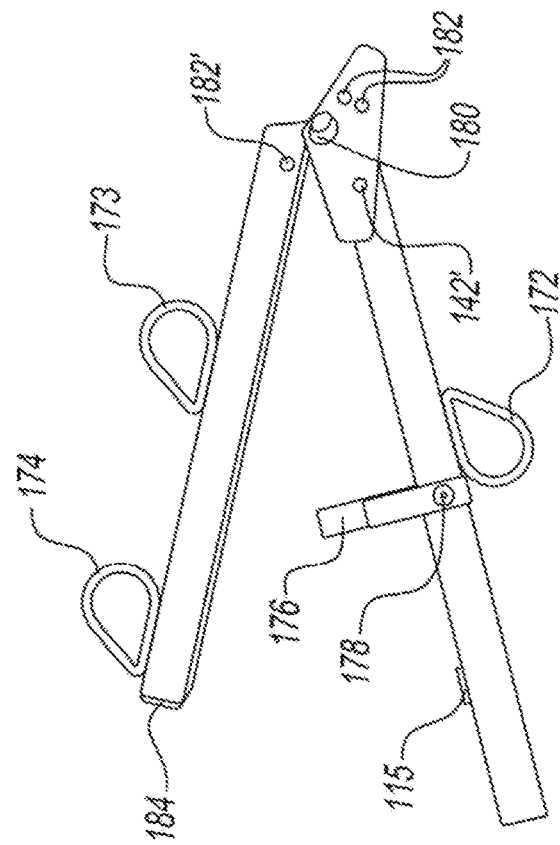
FIGS. 15A-15C depict an exemplary top support post having a protective cap (15A) in closed (15B) and partially open (15C) configurations.
Figure 15B:
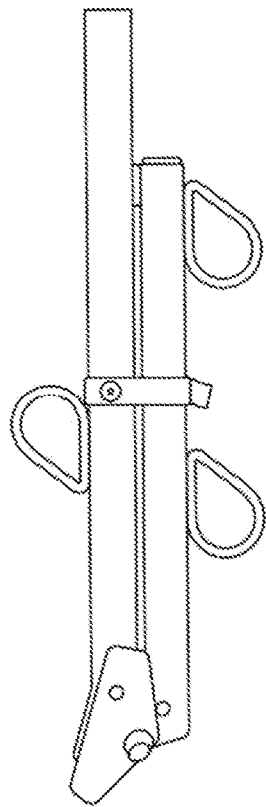
Figure 15A:
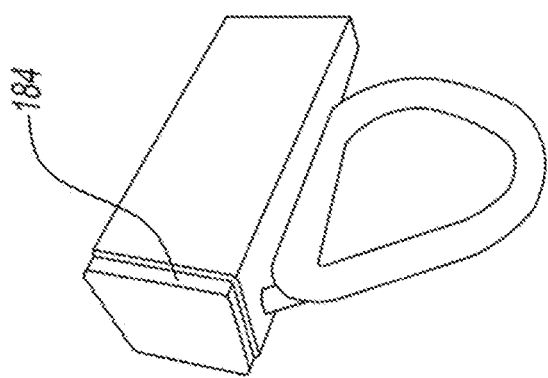
Figure 16A:
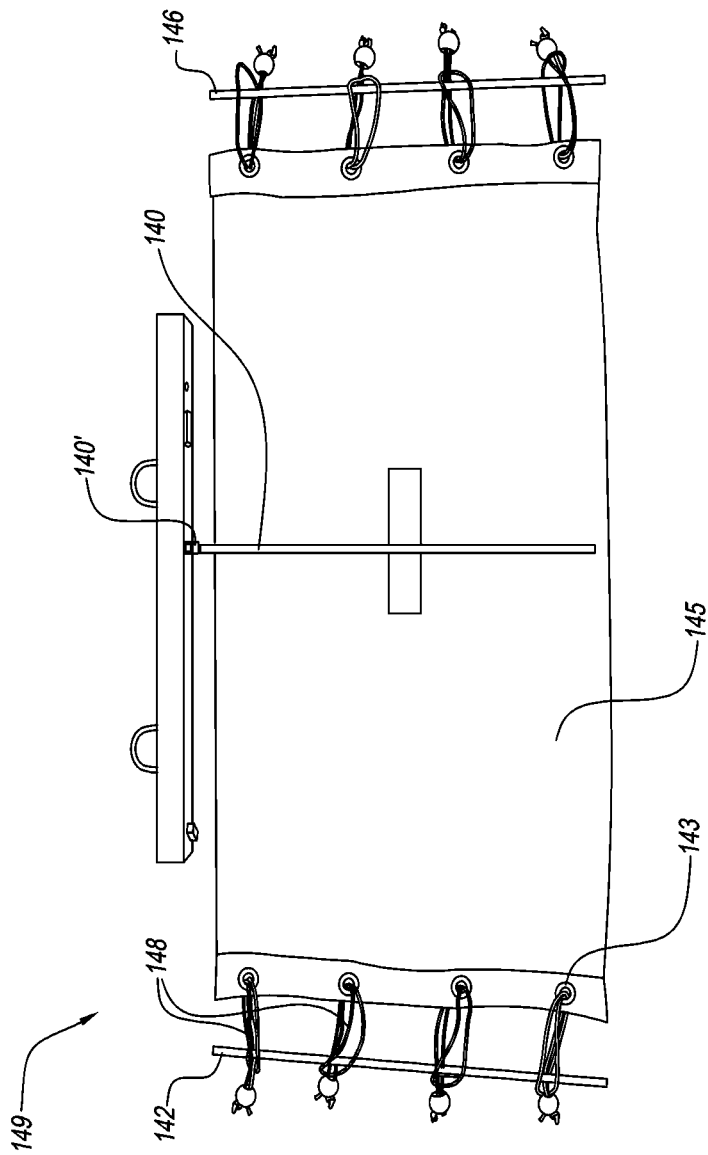
FIGS. 16A-16B depict (close up.
Figure 16B:
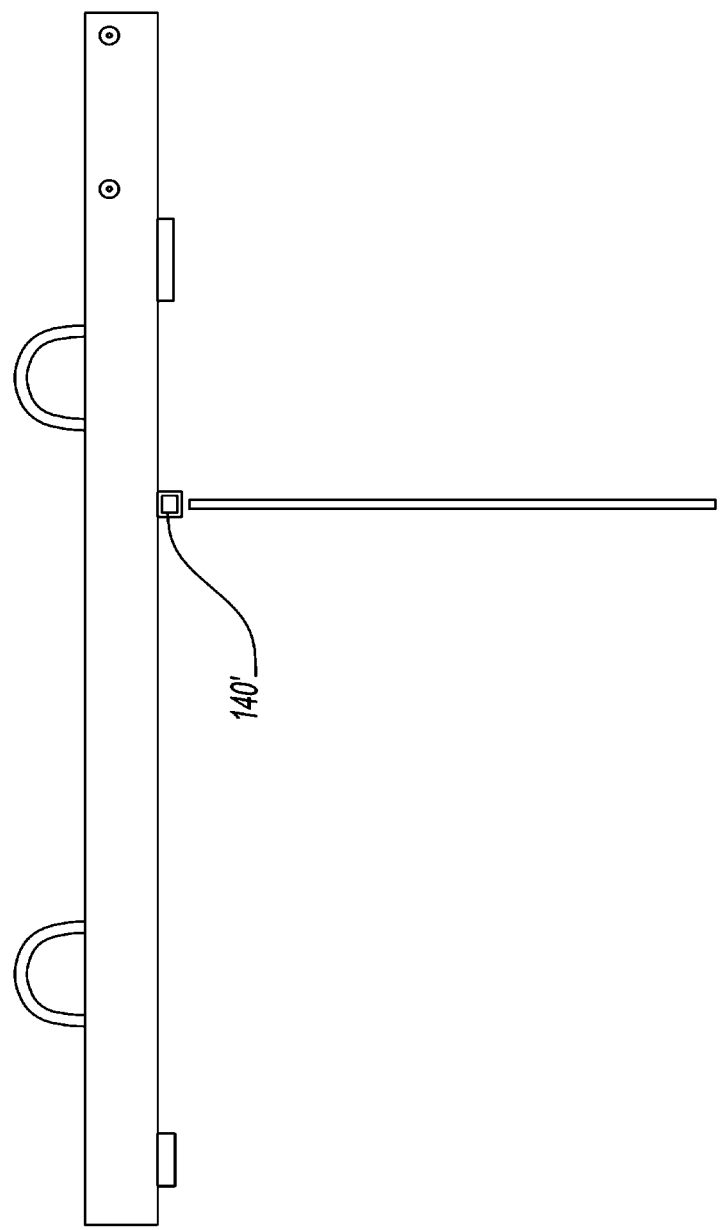
Figure 16C:
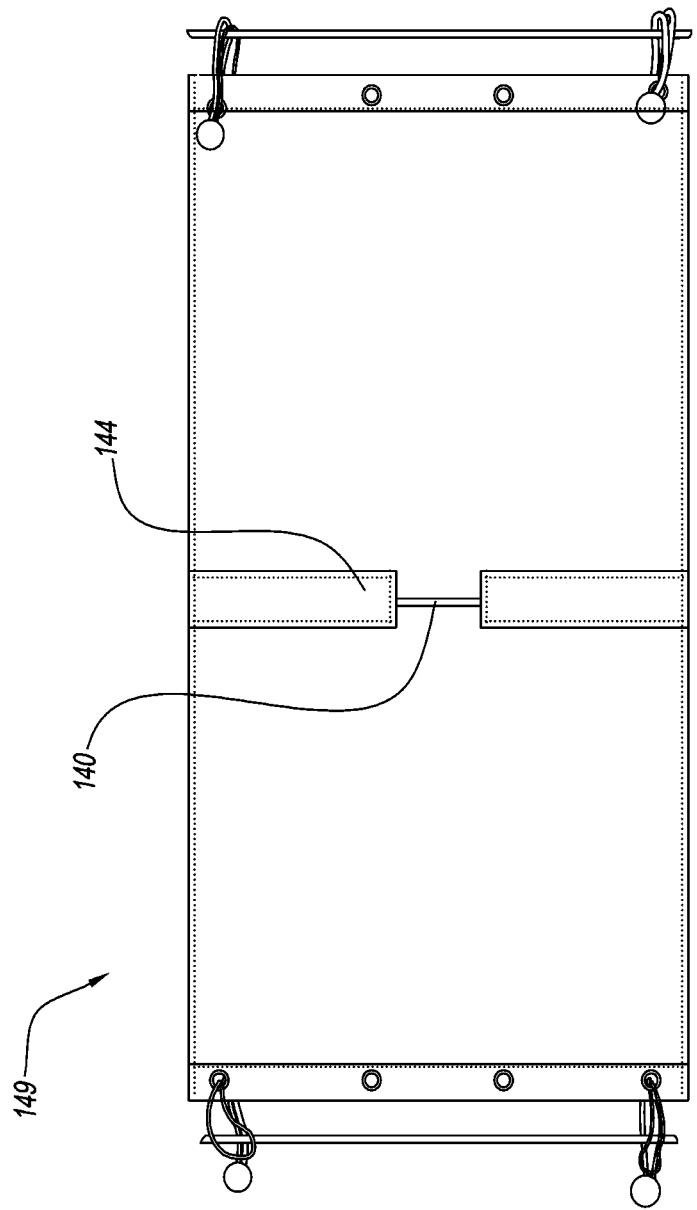
FIG. 16C depicts a top-down view of an exemplary fabric backstop, with the backstop rods and the backstop rod holder of the middle upright support post aligned to show where the middle backstop rod is configured to engage the MOG spire.

In some preferred embodiments, the cantilever hinge 180 may be articulated such that cantilever arm 170' connection aperture 182' may align with one or more hinge connection apertures 182 (see FIG. 15C). This enables the cantilever arm to be adjusted to have different height and angle settings. As shown in FIG. 15A, cantilever arm 170' may include a safety cap 184.

Further, a safety strap 176 may be provided to lock the top folding arm 170' in place against the main portion of the top upright support post 170, for stowage and transport, etc. The safety strap 176 may be attached to the main portion of the top upright support post 170 or to the folding portion/arm 170', via a snap, rivet or other physical attachment mechanism 178. Further, the safety strap may comprise a Velcro strap to make for easier securement of the folding arm/portion 170'.

As depicted in FIGS. 16A-20, the MOG may be outfitted with a backstop 149. The backstop 149, may be held in place by upper 142, middle 140 and lower backstop rods 146. Further, the backstop rods may be held in place by one or more backstop rod holders, such as the backstop rod receiving holes 142' and 146' and backstop rod holder 140', as depicted in FIGS. 2A-3B.

The backstop 149 may be comprised of a nylon fabric blocker 145 that has some give and also some amount of spring or recoil. Further, the backstop fabric 145 may have one or more rod pockets 144 configured to receive the backstop rods. Alternatively, the backstop fabric may terminate at upper and lower ends in a series of grommets 143 periodically perforating the upper and lower ends of the backstop fabric to enable the backstop to be affixed to the upper and lower backstop rods (142 and 146, respectively) via bungee clips or adjustable elastic toggle cords 148.

In certain alternative embodiments, the upper and lower backstop rods may be configured to set in corresponding backstop rod receiving holes (e.g., upper backstop rod receiving hole 142' and lower backstop rod receiving hole 146').

Figure 17:
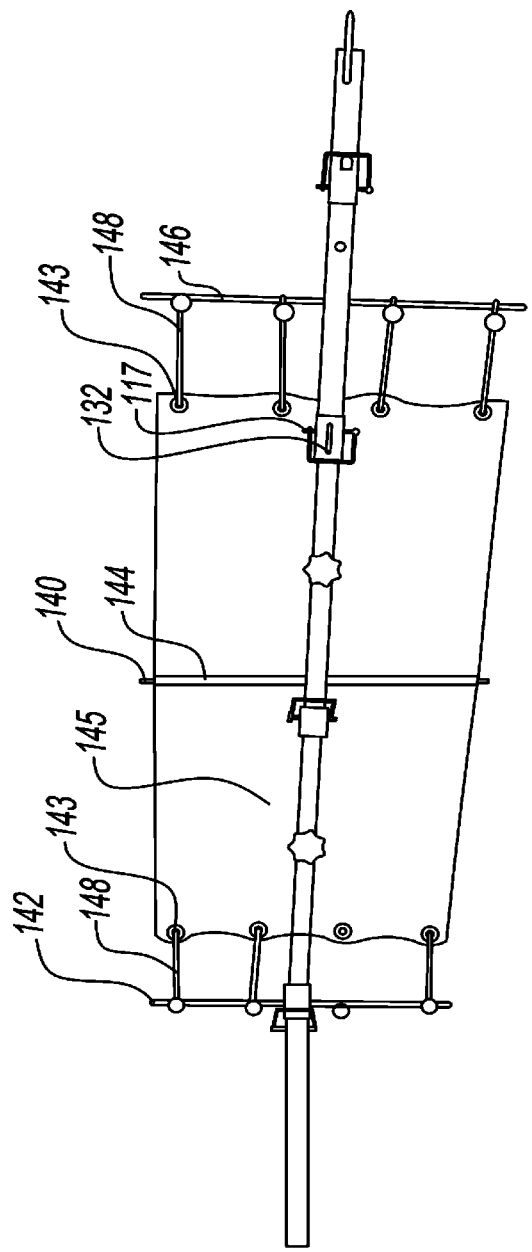
FIG. 17 depicts a fully assembled exemplary MOG spire, have the top support post in the fully extended configuration.

As shown in FIG. 17, set up of the backstop protector 149 includes insertion of backstop rods 142 and 146 into their respective backstop rod receiving holes, 142' and 146' respectively. For embodiments having a backstop rod pocket 144, the backstop rod 140 must be inserted through a first side or portion of the backstop rod pocket 144, then through the backstop rod holder 140', and then through a second side or portion of the backstop rod pocket 144.

Next, the bungee clips or adjustable elastic toggle cords 148 are used to connect backstop rods 142 and 146 to the grommets 143 of either end of the backstop fabric 145, thereby putting tension on the backstop fabric (see FIG. 17). Once the backstop protector 149 is set up, the MOG spire 100 may be used for resistance band weight training exercises with greater confidence that a slipped handle on a taught resistance band will not result in an impact to the rear of the vehicle (e.g., a tailgate of a pickup truck).

The following comprises a list of potential materials, components and elements, including:
  mobile outdoor gym spire 100
  vehicle hitch adapter 102/102'
  wall mount adapter 102"
  vehicle hitch adapter pinhole 104/104'
  main connector portion 106/106' of the vehicle hitch mount adapter
  adapter portion 108/108' of the vehicle hitch mount adapter
  base anchor loop extension member junction 110
  vehicle hitch adapter pin 111
  a hitch pin 111 having a locking pin hole 113
  base anchor loop extension member connecting aperture 112 of the base support post 130, corresponding to capable of aligning with connecting apertures 112' of base anchor loop extension member 114
  alignment/safety stops or alignment/safety collar 115— for star knob bolt alignment with welded
  female threaded nut 120
  base anchor loop 116
  retaining clip lock pins 117
  a hitch pin locking pin 118
  star knob bolt 119 comprising a locking/securement knob and threaded bolt
  female threaded nut 120
  alignment bolt holes 122
  variable height adjustment holes 122'
  base support post 130
  adjustable anchor loop 132 having base support post connection aperture 134
  one or more connection apertures 134'
  middle-base upright support post junction 135
  middle backstop rod 140
  middle backstop rod holder 140'
  nylon fabric blocker 145—stretchy with some give and some recoil
  bungee clips or adjustable elastic toggle cords 148
  top/upper backstop rod 142
  top/upper backstop rod receiving hole 142'
  backstop protector grommet 143
  middle backstop rod pocket 144
  backstop protector fabric 145
  bottom/lower backstop rod 146
  bottom/lower backstop rod receiving hole 146'
  bungee cords or adjustable elastic toggle cords 148
  backstop protector 149
  middle upright support post 150
  adjustable anchor loops 153 having a middle support post connection aperture 154 and retaining lips or edges 156 and 156'
  one or more connection apertures 154'
  top-middle upright support post junction 155
  upper wall mount adapter 160
  top upright support post 170
  folding portion or cantilever arm 170' of the top upright support post
  top upright support post anchor loop 172 second top upright support post anchor loop 174
safety strap 176
safety strap snap or rivet 178
cantilever arm hinge 180
cantilever arm connection aperture 182'
cantilever hinge connection aperture 182
safety cap 184
Additional materials may further include:
1¼" square 11-gauge tube
⅛" 2 HR Strip
⅜" HR Rod
5/16" HR Rod
5/16" square locking pin
¼" locking pin
½" grommets
1¼" square 14-gauge tube
1½" square 14-gauge tube
1¾" square 14-gauge tube
2" square 14-gauge tube In the preceding description, various aspects of claimed subject matter may have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill in the art were omitted or simplified so as not to obscure claimed subject matter.

While certain features have been illustrated or described herein, many modifications, substitutions, or equivalents may not occur to those skilled in the art. It is, therefore, to be understood that the appended claims are intended to cover all such modifications or changes as fall within the true spirit of the claimed subject matter. Thus, it will be apparent from the foregoing that, while particular forms of the invention have been illustrated and described, various modifications can be made without parting from the spirit and scope of the invention.

The claimed invention may be expressed in alternative arrangements while still maintaining the spirit of its original purpose and fundamental features. The described embodiments explain but do not limit the invention to the selected exemplary embodiments. Details concerning the invention are covered in the appended claims rather than the previous description. Additional information in the claims concerning the present invention are to be realized to the extent of their own capacity.

Various modifications and variations of the described invention will be apparent to those skilled in the art without departing from the scope and spirit of the invention. Although the disclosure has been described in connection with specific preferred embodiments, it should be understood that the invention as claimed should not be unduly limited to such specific embodiments. Indeed, those skilled in the art will recognize, or be able to ascertain using no more than routine experimentation, many equivalents to the specific embodiments of the invention described herein. Such equivalents are intended to be encompassed by the following claims.

What is claimed is:

1. A sports equipment device, comprising:
    a mounting member configured to mount the device to a vehicle hitch or to a wall mount, respectively, via a horizontal hitch receiver portion or wall mount receiver portion, and wherein the mounting member further includes a main connector configured to connect to one or more spires;
    the one or more spires, each comprising a base upright support post connected and attached, directly or indirectly, to a top upright support post, wherein the top upright support post further comprises a cantilever hinge and folding arm configured to rotate about an axis of the cantilever hinge and lock into position for use at one or more different angle and height settings, with the folding arm extended and inclined at an angle, wherein a top end of the folding arm is positioned above a horizontal plane intersecting the axis of the cantilever hinge;
    one or more anchor loops or hooks affixed to the one or more spires; and
    at least one exercise resistance band configured to be connected to the one or more anchor loops or hooks.

2. The sports equipment device of claim 1, wherein the base upright support post is further configured to releasably connect and attach to the top upright support post indirectly via one or more middle upright support posts, and wherein a first upright support post comprises the base upright support post, a second upright support post comprises a middle upright support post, and a third upright support post comprises the top upright support post.

3. The sport equipment device of claim 1, wherein the base upright support post is further configured to releasably connect and attach to the top upright support post indirectly via one or more middle upright support posts, and wherein a first upright support post comprises the base upright support post, a second upright support post comprises a first middle upright support post, a third upright support post comprises a second middle upright support post, and a fourth upright support post comprises the top upright support post.

4. The sports equipment device of claim 1, wherein the base upright support post, the top upright support post, and any intervening middle upright support posts serving to indirectly connect and attach the base upright support post to the top upright support post, all fit together and lock into place using one or more mechanisms chosen from the following mechanisms:
    a) one or more releasable button depress locks, wherein the base, middle and top upright support posts are configured to release from being locked in place via the releasable button depress lock;
    b) one or more star-knob male threaded bolts, with a female threaded nuts affixed to a side opposite to a bolt alignment hole, wherein alignment between the one or more star-knob bolts and the alignment hole is set, e.g., by an alignment safety stop or by a variable height alignment hole; and
    c) one or more retaining clip lock pins and alignment holes.

5. The sports equipment device of claim 1, wherein the folding arm further has a safety strap to hold the folding arm in place folded up during stowage.

6. The sports equipment device of claim 1, wherein the base upright support post is connected and attached directly to the top upright support post and the one or more spires each comprise a single upright support post.

7. The sports equipment device of claim 1, wherein the one or more spires include one to three spires.

8. A sports equipment resistance weight training device, comprising:
    a mounting member having a horizontal hitch receiver portion or wall mount receiver portion and a main connector portion configured to connect to one or more spires, wherein the mounting member is configured to mount respectively to a vehicle hitch or to a wall mount;

the one or more spires each comprising a base upright support post connected and attached, directly or indirectly, to a top upright support post, wherein the top upright support post further comprises a cantilever hinge and folding arm configured to rotate about an axis of the cantilever hinge and lock into position, with the folding arm extended and a top end of the folding arm positioned over a horizontal plane intersecting the axis of the cantilever hinge;

one or more anchor loops or hooks affixed to the one or more upright support posts; and at least one exercise resistance band configured to be connected to the one or more anchor loops or hooks.

9. The sports equipment resistance weight training device of claim 8, wherein the base upright support post is connected and attached directly to the top upright support post and the one or more spires each comprise a single upright support post.

10. The sports equipment resistance weight training device of claim 8, wherein the one or more spires include one to three spires.

11. The sports equipment resistance weight training device of claim 8, wherein the base upright support post is further configured to connect and attach to the top upright support post indirectly via one or more middle upright support posts, and wherein a first upright support post comprises the base upright support post, a second upright support post comprises the one or more middle upright support posts, and a third upright support post comprises the top upright support post.

12. The sports equipment resistance weight training device of claim 8, wherein the base upright support post is further configured to connect and attach to the top upright support post indirectly via one or more middle upright support posts, and wherein a first upright support post comprises the base upright support post, a second upright support post comprises a first middle upright support post, a third upright support post comprises a second middle upright support post, and a fourth upright support post comprises the top upright support post.

13. The sports equipment resistance weight training device of claim 8, wherein the base upright support post, the top upright support post, and any intervening middle upright support posts serving to indirectly connect and attach the base upright support post to the top upright support post, all fit together and lock in place using one or more mechanisms chosen from the following mechanisms:
   a) one or more releasable button depress locks, wherein the upright support posts are configured to release from being locked in place via the one or more releasable button depress locks;
   b) one or more star-knob male threaded bolts, with a female threaded nuts affixed to a side opposite to a bolt alignment hole, wherein alignment between the one or more star-knob bolts and the alignment hole is set, e.g., by an alignment safety stop or by a variable height alignment hole; and
   c) one or more retaining clip lock pins and alignment holes.

14. The sports equipment resistance weight training device of claim 8, wherein the folding arm further has a safety strap to hold the folding arm in place during stowage.

15. A mobile resistance weight training system, comprising:
   one or more spires comprising a base upright support post connected and attached, directly or indirectly, to a top upright support post, wherein the base upright support post includes a mounting member having a horizontal hitch receiver portion or wall mount receiver portion respectively configured to mount to a vehicle hitch or to a wall mount, and wherein the top upright support post further comprises a cantilever hinge and folding arm configured to rotate about an axis of the cantilever hinge and lock into position for use, with the folding arm extended and inclined at an angle of between 15 and 80 degrees from vertical, with a top end of the folding arm positioned above a horizontal plane intersecting the axis of the cantilever hinge;
   one or more anchor loops or hooks affixed to the one or more spires; and
   at least one exercise resistance band configured to be connected to the one or more anchor loops or hooks.

16. The mobile resistance weight training system of claim 15, wherein the base upright support post is connected and attached directly to the top upright support post and the one or more spires each comprise a single upright support post.

17. The mobile resistance weight training system of claim 15, wherein the base upright support post is further configured to connect and attach to the top upright support post indirectly via one or more middle upright support posts, and wherein a first upright support post comprises the base upright support post, a second upright support post comprises the one or more middle upright support posts, and a third upright support post comprises the top upright support post.

18. The mobile resistance weight training system of claim 15, wherein the base upright support post is further configured to connect and attach to the top upright support post indirectly via one or more middle upright support posts, and wherein a first upright support post comprises the base upright support post, a second upright support post comprises a first middle upright support post, a third upright support post comprises a second middle upright support post, and a fourth upright support post comprises the top upright support post.

19. The mobile resistance weight training system of claim 15, wherein the base upright support post, the top upright support post, and any intervening middle upright support posts serving to indirectly connect and attach the base upright support post to the top upright support post, all fit together and lock in place using one or more mechanisms chosen from the following mechanisms:
   a) one or more releasable button depress locks, wherein the upright support posts are configured to release from being locked in place via the one or more releasable button locks;
   b) one or more star-knob male threaded bolts, with a female threaded nuts affixed to a side opposite to a bolt alignment hole, wherein alignment between the one or more star-knob bolts and the alignment hole is set, e.g., by an alignment safety stop or by a variable height alignment hole; and
   c) one or more retaining clip lock pins and alignment holes.

20. The mobile resistance weight training system of claim 15, wherein the folding arm further has a safety strap to hold the folding arm in place during stowage.

21. The mobile resistance weight training system of claim 15, wherein the one or more spires include one to three spires.

* * * * *